United States Patent
Truong et al.

(10) Patent No.: US 9,767,268 B2
(45) Date of Patent: Sep. 19, 2017

(54) OPTIMIZING A COMPILED ACCESS CONTROL TABLE IN A CONTENT MANAGEMENT SYSTEM

(75) Inventors: Phong Kim Truong, San Jose, CA (US); Eileen HongLian Wang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 531 days.

(21) Appl. No.: 13/090,422

(22) Filed: Apr. 20, 2011

(65) Prior Publication Data

US 2012/0271854 A1    Oct. 25, 2012

(51) Int. Cl.
    *G06F 21/62*      (2013.01)
    *G06F 21/41*      (2013.01)
    *G06F 21/45*      (2013.01)

(52) U.S. Cl.
    CPC .......... *G06F 21/41* (2013.01); *G06F 21/45* (2013.01); *G06F 21/6227* (2013.01)

(58) Field of Classification Search
    CPC ....... G06F 21/41; G06F 21/45; G06F 21/6227
    USPC ........................................ 707/785
    See application file for complete search history.

(56) References Cited

U.S. PATENT DOCUMENTS

| | | | |
|---|---|---|---|
| 4,445,177 A * | 4/1984 | Bratt | G06F 8/41 712/245 |
| 5,390,312 A | 2/1995 | Chiarot et al. | |
| 5,495,533 A | 2/1996 | Linehan et al. | |
| 5,504,892 A | 4/1996 | Atsatt et al. | |
| 5,552,776 A | 9/1996 | Wade et al. | |
| 5,560,005 A | 9/1996 | Hoover et al. | |
| 5,627,987 A | 5/1997 | Nozue et al. | |
| 5,649,099 A | 7/1997 | Theimer et al. | |
| 5,701,458 A | 12/1997 | Bsaibes et al. | |
| 5,758,153 A | 5/1998 | Atsatt et al. | |
| 5,761,669 A * | 6/1998 | Montague | G06F 21/604 707/758 |
| 5,774,650 A * | 6/1998 | Chapman et al. | 726/7 |
| 5,774,668 A | 6/1998 | Choquier et al. | |
| 5,778,222 A | 7/1998 | Herrick et al. | |
| 5,941,947 A | 8/1999 | Brown et al. | |
| 6,014,666 A | 1/2000 | Helland et al. | |
| 6,032,158 A | 2/2000 | Mukhopadhyay et al. | |

(Continued)

FOREIGN PATENT DOCUMENTS

WO      99/40502 A1    8/1999

OTHER PUBLICATIONS

"Elements of Security: AIX 4.1," by International Technical Support Organization Poughkeepsie Center. 1994. Available at: http://www.redbooks.ibm.com/redbooks/pdfs/gg244433.pdf.*

(Continued)

*Primary Examiner* — Phuong Thao Cao
(74) *Attorney, Agent, or Firm* — Farrokh Pourmirzaie; Edell, Shapiro & Finnan, LLC

(57) ABSTRACT

A method, computer program product, and system for improving the operation and management of a content management system, by managing data security and incremental refreshes of a compiled access control table. A user may be authorized to access an entity such as a data item by reference to a single table that compiles ACL information from a plurality of tables, without repetitive access to several system tables.

22 Claims, 17 Drawing Sheets

(56) References Cited

U.S. PATENT DOCUMENTS

| | | | |
|---|---|---|---|
| 6,052,785 A | 4/2000 | Lin et al. | |
| 6,105,027 A | 8/2000 | Schneider et al. | |
| 6,141,754 A | 10/2000 | Choy | |
| 6,161,139 A | 12/2000 | Win et al. | |
| 6,195,705 B1 | 2/2001 | Leung | |
| 6,202,066 B1* | 3/2001 | Barkley | G06F 21/6218 707/785 |
| 6,256,715 B1 | 7/2001 | Hansen | |
| 6,308,173 B1 | 10/2001 | Glasser et al. | |
| 6,438,549 B1 | 8/2002 | Aldred et al. | |
| 6,460,141 B1 | 10/2002 | Olden | |
| 6,460,171 B1 | 10/2002 | Couvert et al. | |
| 6,470,353 B1 | 10/2002 | Yaung et al. | |
| 6,523,027 B1 | 2/2003 | Underwood | |
| 6,581,060 B1 | 6/2003 | Choy | |
| 6,609,128 B1 | 8/2003 | Underwood | |
| 6,625,603 B1* | 9/2003 | Garg | G06F 9/468 707/758 |
| 6,631,374 B1 | 10/2003 | Klein et al. | |
| 6,633,878 B1 | 10/2003 | Underwood | |
| 6,718,535 B1 | 4/2004 | Underwood | |
| 6,732,124 B1 | 5/2004 | Koseki et al. | |
| 6,757,680 B1 | 6/2004 | Choy | |
| 6,772,350 B1 | 8/2004 | Belani et al. | |
| 6,823,338 B1 | 11/2004 | Byrne et al. | |
| 6,823,452 B1 | 11/2004 | Doyle et al. | |
| 6,976,023 B2* | 12/2005 | Chen | G06F 21/10 707/785 |
| 7,016,907 B2 | 3/2006 | Boreham et al. | |
| 7,080,085 B1 | 7/2006 | Choy et al. | |
| 7,133,884 B1 | 11/2006 | Murley et al. | |
| 7,213,262 B1* | 5/2007 | Elley et al. | 726/10 |
| 7,216,126 B2 | 5/2007 | Choy | |
| 7,249,374 B1 | 7/2007 | Lear et al. | |
| 7,272,550 B2 | 9/2007 | Chen et al. | |
| 7,284,265 B2 | 10/2007 | Choy et al. | |
| 7,308,580 B2 | 12/2007 | Nelson et al. | |
| 7,761,404 B2 | 7/2010 | Chen et al. | |
| 7,801,852 B2 | 9/2010 | Wong et al. | |
| 7,809,749 B2 | 10/2010 | Ho et al. | |
| 7,827,598 B2 | 11/2010 | Moran et al. | |
| 7,925,666 B1* | 4/2011 | Johnson et al. | 707/781 |
| 7,984,066 B1* | 7/2011 | Kilday et al. | 707/781 |
| 8,001,611 B2 | 8/2011 | Nelson et al. | |
| 8,332,365 B2 | 12/2012 | McAlister et al. | |
| 8,959,115 B2* | 2/2015 | Marathe | G06F 21/604 707/785 |
| 2001/0037379 A1 | 11/2001 | Livnat | |
| 2002/0002577 A1 | 1/2002 | Garg et al. | |
| 2003/0028495 A1* | 2/2003 | Pallante | G06Q 20/00 705/78 |
| 2003/0074250 A1* | 4/2003 | Burk | 705/10 |
| 2003/0200215 A1* | 10/2003 | Chen | G06F 21/10 |
| 2003/0200443 A1* | 10/2003 | Chen | G06F 21/6218 713/182 |
| 2003/0200466 A1* | 10/2003 | Nelson | G06F 21/31 726/3 |
| 2003/0200467 A1* | 10/2003 | Choy | G06F 21/6218 726/4 |
| 2004/0193546 A1* | 9/2004 | Tokutani | G06F 21/10 705/59 |
| 2004/0254934 A1* | 12/2004 | Ho | G06F 21/6218 |
| 2005/0055573 A1 | 3/2005 | Smith | |
| 2005/0185792 A1* | 8/2005 | Tokutani | H04L 63/0442 380/30 |
| 2005/0262551 A1 | 11/2005 | Chen et al. | |
| 2006/0230043 A1* | 10/2006 | Sumner-Moore | G06F 21/6218 |
| 2007/0086435 A1* | 4/2007 | Kaler | H04L 67/104 370/352 |
| 2007/0098013 A1* | 5/2007 | Brown | H04L 12/24 370/466 |
| 2007/0100990 A1* | 5/2007 | Brown | H04L 43/0817 709/224 |
| 2007/0220029 A1* | 9/2007 | Jones | G06F 17/30221 |
| 2008/0022370 A1* | 1/2008 | Beedubail | G06F 21/6218 726/4 |
| 2008/0027987 A1 | 1/2008 | Arora et al. | |
| 2008/0065751 A1* | 3/2008 | Hampson | 709/223 |
| 2008/0071788 A1* | 3/2008 | Muller | G06F 21/604 |
| 2008/0122871 A1* | 5/2008 | Guday | G06F 21/6218 345/634 |
| 2008/0141346 A1* | 6/2008 | Kay | H04L 12/58 726/4 |
| 2008/0172720 A1* | 7/2008 | Botz | G06F 21/604 726/3 |
| 2008/0243852 A1* | 10/2008 | Brunner et al. | 707/9 |
| 2008/0307486 A1 | 12/2008 | Ellison et al. | |
| 2008/0307520 A1 | 12/2008 | Nelson et al. | |
| 2008/0313721 A1* | 12/2008 | Corella | 726/6 |
| 2008/0320588 A1* | 12/2008 | Lipetz | 726/19 |
| 2009/0037494 A1 | 2/2009 | Wong et al. | |
| 2009/0177709 A1 | 7/2009 | Zou et al. | |
| 2010/0082529 A1 | 4/2010 | Mace et al. | |
| 2010/0250519 A1* | 9/2010 | Fiebig | G06F 17/30935 707/718 |
| 2010/0281060 A1* | 11/2010 | Ahmed et al. | 707/785 |
| 2010/0319067 A1* | 12/2010 | Mohanty | G06F 21/6218 726/21 |
| 2010/0325686 A1* | 12/2010 | Davis | G06F 21/62 726/1 |
| 2011/0218999 A1* | 9/2011 | Kan | G06F 17/30306 707/737 |
| 2012/0271854 A1* | 10/2012 | Truong | G06F 21/41 707/785 |

OTHER PUBLICATIONS

"IBM System p," by Wikipedia. (Revision of Mar. 8, 2010). Available at: http://en.wikipedia.org/w/index.php?title=IBM_System_p&oldid=348511687.*

Kang et al., "An Integrated Access Control in Heterogeneous Distributed Database Systems", IEEE Region 10 Conference, Tencon 92, Nov. 11-13, 1992, Melbourne, Australia, pp. 222-226.*

Office Action History of U.S. Appl. No. 10/131,008, now U.S. Pat. No. 7,308,580, Mar. 28, 2011.

Office Action History of U.S. Appl. No. 10/131,634, now U.S. Pat. No. 7,272,550, Mar. 28, 2011.

Office Action History of U.S. Appl. No. 10/131,651, now U.S. Pat. No. 6,976,023, Mar. 28, 2011.

Office Action History of U.S. Appl. No. 10/131,659, now U.S. Pat. No. 7,284,265, Mar. 28, 2011.

Office Action History of U.S. Appl. No. 11/182,148, now U.S. Pat. No. 7,761,404, Mar. 28, 2011.

Office Action History of U.S. Appl. No. 11/975,579, published as U.S. Publ. 2008/0307520, Mar. 28, 2011.

Sandhu et al. "NetWare 4 as an Example of Role-Based Access Control". ACM Press, 1996. 12 pages.

Swift et al. "Improving the Granularity of Access Control in Windows NT." ACM Workshop on Role Based Access Control. pp. 87-96. May 2001.

Abadi et al. "A Calculus for Access Control in Distributed Systems." ACM Transactions on Programming Languages and Systems, vol. 15, No. 4, Sep. 1993, pp. 706-734.

Chan et al., "Incremental Update to Aggregated Information for Data Warehouses over Internet", Proceedings of the 3rd ACM international workshop on Data warehousing and OLAP, 2000, pp. 57-64.

Crall, Chris et al. Authorization in Enterprise-wide Distributed System a Practical Design and Application. Proceedings 14th Annual Computer Security Applications Conference. Los Alamitos, CA: IEEE Comput. Soc., 1998. 12 pages.

Dictionary.com, Incremental (Definition), pp. 1-2 <URL:http://dictionary.reference.com/browse/incremental> retrieved online Jul. 27, 2006.

Dictionary.com, Refresh (Definition), pp. 1-3 <URL:http://dictionary.reference.com/browse/refresh> retrieved online Jul. 27, 2006.

Dictionary.com, Update (Definition), pp. 1-2 <URL:http://dictionary.reference.com/browse/update> retrieved online Jul. 26, 2006.

(56) References Cited

OTHER PUBLICATIONS

Dictionary.com, Retrieved online <URL:http://dictionary.reference.com/search?q=compile>, Compile, definition of.

H.M. Gladney. "Access Control for Large Collections." ACM Transactions on Information Systems, vol. 15, No. 2. Apr. 1997, pp. 154-157.

Han, Yan et al. Constraint Specification for Object Model of Access Control Based on Role. Software Engineering Notes, vol. 25, No. 2, Mar. 2000. USA: ACM. 60-64. [Inspec Abstract AN 6580279, ABN C2000-06-6130S-023].

Hayton, Richard et al. An Open Architecture for Secure Interworking Services. Proceedings of the 17th International Conference on Distributed Computing Systems. Los Alamitos, CA: IEEE Comput. Soc. Press, 1997. 315-321.

IBM Content Manager for Multiplatforms System Administration Guide, Version 7.1. USA: IBM Corporation Doc. No. SC27-0868-00, First Edition (Jan. 2001). [Accessed Mar. 27, 2002 2:27 PM at http://www-4.ibm.com/software/data/cm/pubs/cm71/sysadm/frns2mst02.htm].

IBM Corp. Content Manager for Multiplatforms. Wysiwyg://2/http://www-4.ibm.com/software/data/cm/cmgrimp/about.html; and Wysiwyg://11/http://www-4.ibm.com/software/data/cm/cmgr/mp [accessed Mar. 26, 2002 5:13 PM].

Kavaln, Vasanthi et al. A Mobile Agent for Asynchronous Administration of Multiple DBMS Servers. Proceedings of the IEEE Third International Workshop on systems Management. Los Alamitos, CA: IEEE Compt. Soc., 1998. 1-2.

Okamoto, Tatsuaki. A Single Public-Key Authentication Scheme for Multiple Users. Systems and Computer in Japan, vol. 18, No. 10, pp. 14-24, Oct. 1987.

Thesaurus.com,Refresh (Synonyms), pp. 1-4 <URL:http://thesaurus.reference.com/browse/refresh> retrieved online Jul. 27, 2006.

\* cited by examiner

SYSTEM CONTROL TABLE

| DATABASE NAME 81 | ACL BINDING LEVEL 82 | LIBRARY ACL CODE 83 | PUBLIC ACCESS ENABLED 84 | ALLOW TRUSTED LOGON 85 | ... |
|---|---|---|---|---|---|
| R&D-DB1 | 1 | 3 | Y | Y | ... |
| ACCTG | 3 | 4 | N | N | ... |
| ... | ... | ... | ... | ... | ... |

| USERS TABLE 110 | | | | | | | |
|---|---|---|---|---|---|---|---|
| USER ID | UNUM | USER KIND | USER PRIV SET CODE | GRANT PRIV SET CODE | DEFAULT ACL CODE | PASSWORD | USER NAME |
| 112 | 113 | 114 | 115 | 116 | 117 | 118 | 119 |
| J_DOE | 1000 | INDIV. | 3 | 4 | 1 | ********** | JOHN DOE |
| J_GARCIA | 1001 | INDIV. | 4 | 2 | 4 | ****** | JUAN GARCIA |
| J_MILLER | 1002 | INDIV. | 4 | 2 | 4 | ***** | JOSEPH MILLER |
| J_SMITH | 1003 | INDIV. | 4 | 2 | 3 | ********* | JANE SMITH |
| J. TAYLOR | 1004 | INDIV. | 4 | 2 | 3 | ****** | JOAN TAYLOR |
| ADMIN | 2 | GROUP | - | - | - | - | ALL SYSTEM ADMINS |
| R&D | 1005 | GROUP | - | - | - | - | R&D EMPLOYEES |
| PROJX | 1006 | GROUP | - | - | - | - | SPECIAL PROJECT GROUP X |
| ... | ... | ... | ... | ... | ... | ... | ... |

FIG.4

| USERS GROUP TABLE 120 | | | | |
|---|---|---|---|---|
| INDIVIDUAL USER ID | INDIVIDUAL USER NUM | GROUP USER ID | GROUP USER NUM | ... |
| 122 | 123 | 124 | 125 | |
| J_DOE | 1000 | ADMIN | 2 | ... |
| J_GARCIA | 1001 | R&D | 1005 | ... |
| J_SMITH | 1003 | R&D | 1005 | ... |
| J. TAYLOR | 1004 | R&D | 1005 | ... |
| J. TAYLOR | 1004 | PROJX | 1006 | ... |
| ... | ... | ... | ... | ... |

FIG.5

| ACCESS CODES TABLE 130 |||| |
|---|---|---|---|
| ACL CODE 132 | ACLNAME 133 | ACLDESC 134 | ... |
| 1 | SUPERUSERACL | ACL ALLOWS CM PRE-CONFIGURED GROUP ADMIN TO PERFORM ALL CM FUNCTIONS ON BOUND ENTITIES | ... |
| 2 | NOACCESSACL | ACL SPECIFIES, FOR ALL CM USERS, NO ACTIONS ARE ALLOWED ON BOUND ENTITIES | ... |
| 3 | PUBLICREADACL | ACL ALLOWS ALL CM USERS TO READ BOUND ENTITIES | ... |
| 4 | STANDARDUSERACL | ACL ALLOWS SUBSET OF CM USERS TO WRITE, MOVE AND PRINT BOUND ENTITIES | ... |
| ... | ... | ... | ... |

FIG.6

| ACCESS CONTROL (AC) LIST TABLE 50 ||||| 
|---|---|---|---|---|
| USER KIND 114 | USER ID 112 | ACL CODE 132 | PRIVILEGE SET CODE 72 | ... |
| ... | ... | ... | ... | ... |
| INDIV. | J_DOE | 1 | 1 | ... |
| INDIV. | J_MILLER | 3 | 4 | ... |
| GROUP | ADMIN | 1 | 3 | ... |
| GROUP | R&D | 4 | 5 | ... |
| GROUP | PROJX | 4 | 7 | ... |
| PUBLIC | PUBLIC | 3 | 6 | ... |
| ... | ... | ... | ... | ... |

FIG.7

| PRIVILEGE DEFINITIONS TABLE 60 | | | |
|---|---|---|---|
| PRIV DEF CODE 65 | PRIVDEFNAME 66 | PRIVDEFDESC 67 | ... |
| 1 | ALLOWCONNECTTOLOGON | LOGON WITH A DIFFERENT USERID THAN THE ONE USED TO CONNECT | ... |
| 40 | SYSTEMADMIN | CM SYSTEM ADMINISTRATION PRIVILEGE | ... |
| 41 | SYSTEMQUERY | QUERY CM SYSTEM INFORMATION | ... |
| 42 | SYSTEMDEFINEUSER | CREATE AND UPDATE USERS | ... |
| 43 | SYSTEMQUERYUSERPRIV | QUERY OTHER USER'S PRIVILEGES | ... |
| 44 | SYSTEMGRANTUSERPRIV | GRANT OTHER USER'S PRIVILEGES | ... |
| 45 | SYSTEMDEFINEITEMTYPE | QUERY, CREATE, UPDATE, AND DELETE ITEM TYPES AND ATTRIBUTES | ... |
| ... | ... | ... | ... |
| 120 | ITEMSUPERACCESS | BYPASS ACL CHECK | ... |
| 121 | ITEMSQLSELECT | SELECT ITEMS USING SQL INTERFACE | ... |
| 122 | ITEMTYPEQUERY | QUERY ITEM TYPE AND ATTRIBUTE DEFINITIONS | ... |
| 123 | ITEMQUERY | QUERY ITEMS | ... |
| 124 | ITEMADD | CREATE ITEMS | ... |
| 125 | ITEMSETUSERATTR | UPDATE ITEM'S USER-DEFINED ATTRIBUTE VALUES | ... |
| 126 | ITEMSETSYSATTR | UPDATE ITEM'S SYSTEM-DEFINED ATTRIBUTE VALUES | ... |
| 127 | ITEMDELETE | DELETE ITEMS | ... |
| 128 | ITEMMOVE | MOVE ITEMS BETWEEN ITEM TYPES | ... |
| 129 | ITEMLINKTO | HETEROGENEOUSLY LINK ITEMS TO OTHER ITEMS (MAKE THE ITEMS FOREIGN KEY CHILDREN) | ... |
| 130 | ITEMLINKED | SET ITEMS TO BE HETEROGENEOUSLY LINKED BY OTHER ITEMS (MAKE THE ITEMS FOREIGN KEY PARENTS) | ... |
| 131 | ITEMOWN | SET ITEMS TO OWN A COLLECTION OF ITEMS | ... |
| 132 | ITEMOWNED | SET ITEMS TO BE OWNED BY OTHER ITEMS | ... |
| ... | ... | ... | ... |
| 1000 | USERPRIV1 | (USER DEFINED PRIVILEGE) | ... |
| ... | ... | ... | ... |

FIG.8

| PRIVILEGE SETS TABLE | | | 70 | |
|---|---|---|---|---|
| PRIV SET CODE  72 | PRIV SET NAME  73 | PRIV DEF CODE  65 | PRIVDEFNAME  66 | ... |
| ... | | ... | ... | ... |
| 1 | ALLPRIVSET | 40 | SYSTEMADMIN | ... |
| 1 | ALLPRIVSET | 41 | SYSTEMQUERY | ... |
| 1 | ALLPRIVSET | 42 | SYSTEMDEFINEUSER | ... |
| 1 | ALLPRIVSET | 43 | SYSTEMQUERYUSERPRIV | ... |
| 1 | ALLPRIVSET | 44 | SYSTEMGRANTUSERPRIV | ... |
| 1 | ALLPRIVSET | 45 | SYSTEMDEFINEITEMTYPE | ... |
| 1 | ALLPRIVSET | 120 | ITEMSUPERACCESS | ... |
| 1 | ALLPRIVSET | 121 | ITEMSQLSELECT | ... |
| ... | | ... | ... | ... |
| 1 | ALLPRIVSET | 130 | ITEMLINKED | ... |
| 1 | ALLPRIVSET | 131 | ITEMOWN | ... |
| 1 | ALLPRIVSET | 132 | ITEMOWNED | ... |
| 3 | SYSTEMADMINPRIVSET | 40 | SYSTEMADMIN | ... |
| 3 | SYSTEMADMINPRIVSET | 45 | SYSTEMDEFINEITEMTYPE | ... |
| 4 | ITEMADMINPRIVSET | 45 | SYSTEMDEFINEITEMTYPE | ... |
| 4 | ITEMADMINPRIVSET | 121 | ITEMSQLSELECT | ... |
| 4 | ITEMADMINPRIVSET | 122 | ITEMTYPEQUERY | ... |
| ... | | ... | ... | ... |
| 4 | ITEMADMINPRIVSET | 131 | ITEMOWN | ... |
| 4 | ITEMADMINPRIVSET | 132 | ITEMOWNED | ... |
| 5 | ITEMLOADPRIVSET | 124 | ITEMADD | ... |
| 5 | ITEMLOADPRIVSET | 128 | ITEMMOVE | ... |
| 5 | ITEMLOADPRIVSET | 130 | ITEMLINKED | ... |
| 5 | ITEMLOADPRIVSET | 132 | ITEMOWNED | ... |
| 6 | ITEMREADPRIVSET | 121 | ITEMSQLSELECT | ... |
| 6 | ITEMREADPRIVSET | 123 | ITEMQUERY | ... |
| 7 | CMCONNECTPRIVSET | 1 | ALLOWCONNECTTOLOGON | ... |
| | | ... | ... | ... |

FIG.9

| PRIVILEGE SETS CODE TABLE 140 | | |
|---|---|---|
| PRIV SET CODE 72 | PRIVSETNAME 73 | PRIVSETDESC 142 |
| 1 | ALLPRIVSET | CAN PERFORM ALL CM FUNCTIONS ON ALL CM LIBRARY ENTITIES |
| 2 | NOPRIVSET | CANNOT PERFORM ANY CM FUNCTIONS ON ANY CM LIBRARY ENTITIES |
| 3 | SYSTEMADMINPRIVSET | CAN PERFORM ALL CM SYSTEM ADMINISTRATION AND DATA MODELING FUNCTIONS |
| 4 | ITEMADMINPRIVSET | CAN PERFORM ALL CM DATA MODELING AND ITEM ACCESS FUNCTIONS |
| 5 | ITEMLOADPRIVSET | CAN LOAD ITEMS INTO CM LIBRARY |
| 6 | ITEMREADPRIVSET | CAN SEARCH AND VIEW CM ITEMS |
| 7 | CMCONNECTPRIVSET | CAN LOGON WITH DIFFERENT USERID THAN THE ONES USED TO CONNECT |
| ... | ... | ... |

FIG.10

| COMPILED ACL TABLE 150 |||||||
|---|---|---|---|---|---|---|
| UNUM | USER KIND | ACL CODE | PRIVILEGE SET CODE | PRIVILEGE BITS (DEF. CODES 65) | GROUP FLAGS | READ FLAGS |
| 113 | 114 | 132 | 72 | 152 | 153 | 154 |
| ... | ... | ... | ... | ... | ... | ... |
| 1000 | INDIV. | 1 | 1 | 131, 132 | N | N |
| 1002 | INDIV. | 3 | 4 | 45, 121 ... 131, 132 | N | Y |
| 1005 | GROUP | 4 | 5 | 124, 128, 130, 132 | Y | N |
| 1006 | GROUP | 4 | 7 | 1 | Y | N |
| ... | ... | ... | ... | ... | ... | ... |

OPTIMIZING A COMPILED ACCESS CONTROL TABLE IN A CONTENT MANAGEMENT SYSTEM

BACKGROUND

1. Technical Field

The present invention relates generally to data security in a content management system, and more particularly to the use and refresh of a compiled access control table.

2. Discussion of Related Art

In a content management system, access to data objects, such as files, folders, databases, and other data elements may be controlled through the use of privilege sets, users and user groups, and access control lists. Users are individuals who are identified as authorized to log on to the system, and user groups are groups of users with common access needs. Each user is assigned a user ID, password, and privilege set. A privilege set identifies the functions that a user can perform, such as creating folders or adding objects to a workbasket.

When a user is logged onto the content management system and makes a request of the system, the system checks the user's privilege set to ensure that the user is allowed to perform the requested function. An access control list (ACL) protects access to the objects (also referred to as items) in the system. An access control list is assigned to each index class, workbasket, and workflow object when it is created. When a logged on user attempts to access an object, the system first checks the user's privilege set to ensure that the user is allowed to perform the requested function, and then checks the access control list for that object to ensure that the user is allowed to perform the requested function on that object. Thus, an access control list may be used to remove otherwise privileged functions—that is, functions which a user is authorized to perform by his privilege set may be denied with respect to a particular object. The result is, that to resolve authorization for a user operating on an item, several system tables must be accessed repetitively. The runtime overhead of such procedural process is a major performance concern.

BRIEF SUMMARY

Accordingly, embodiments of the present invention include a method, computer program product and a system for authorizing access to an entity in a content management system by a user by reference to a single table which compiles access control information from a plurality of tables, comprising binding an entity stored in a content management system to an access control (AC) list table, wherein the AC list table comprises a plurality of access control lists, for each of a plurality of individual users of the content management system, specifying a membership in zero, one or more user groups, specifying a set of group privileges for each user group, specifying a set of user privileges for each individual user that is a member of zero user groups, intersecting the AC list table, the sets of group privileges, and the sets of user privileges in a computer-generated access control list (ACL) table stored in a memory, the columns of the computer-generated ACL table comprising user kind, user identifier, ACL code, and a privilege set comprising a privilege set code and a privilege definition code, and the rows of the computer-generated ACL table corresponding to either a user group, or an individual user that is a member of zero user groups, and incrementally refreshing the computer-generated ACL table responsive to run time modification of the access control list, the sets of group privileges, or the set of user privileges, the incrementally refreshing including, responsive to modification of the privilege set, accessing during on-line execution to affect only rows of the computer-generated ACL table having a corresponding privilege set code.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 4 illustrates a user table 110 according to an embodiment of the present invention.

FIG. 5 illustrates a user group table 120 according to an embodiment of the present invention.

FIG. 6 illustrates an access codes table 130 according to an embodiment of the present invention.

FIG. 7 illustrates an access control list table 50 according to an embodiment of the present invention.

FIG. 8 illustrates a privileges definitions table 60 according to an embodiment of the present invention.

FIG. 9 illustrates a privilege sets table 70 according to an embodiment of the present invention.

FIG. 10 illustrates a privilege sets code table 140 according to an embodiment of the present invention.

FIG. 11 illustrates a compiled ACL table 150 according to an embodiment of the present invention.

DETAILED DESCRIPTION

The present embodiments improve the operation and management of a content management system, by managing data security and incremental refreshes of a compiled access control table. The present embodiments provide that a user may be authorized to access a data item or other data entity by reference to a single table that compiles ACL information from a plurality of tables, without repetitive access to several system tables. The present embodiments also maintain and optimize the currency of a compiled ACL table.

Figure 1:
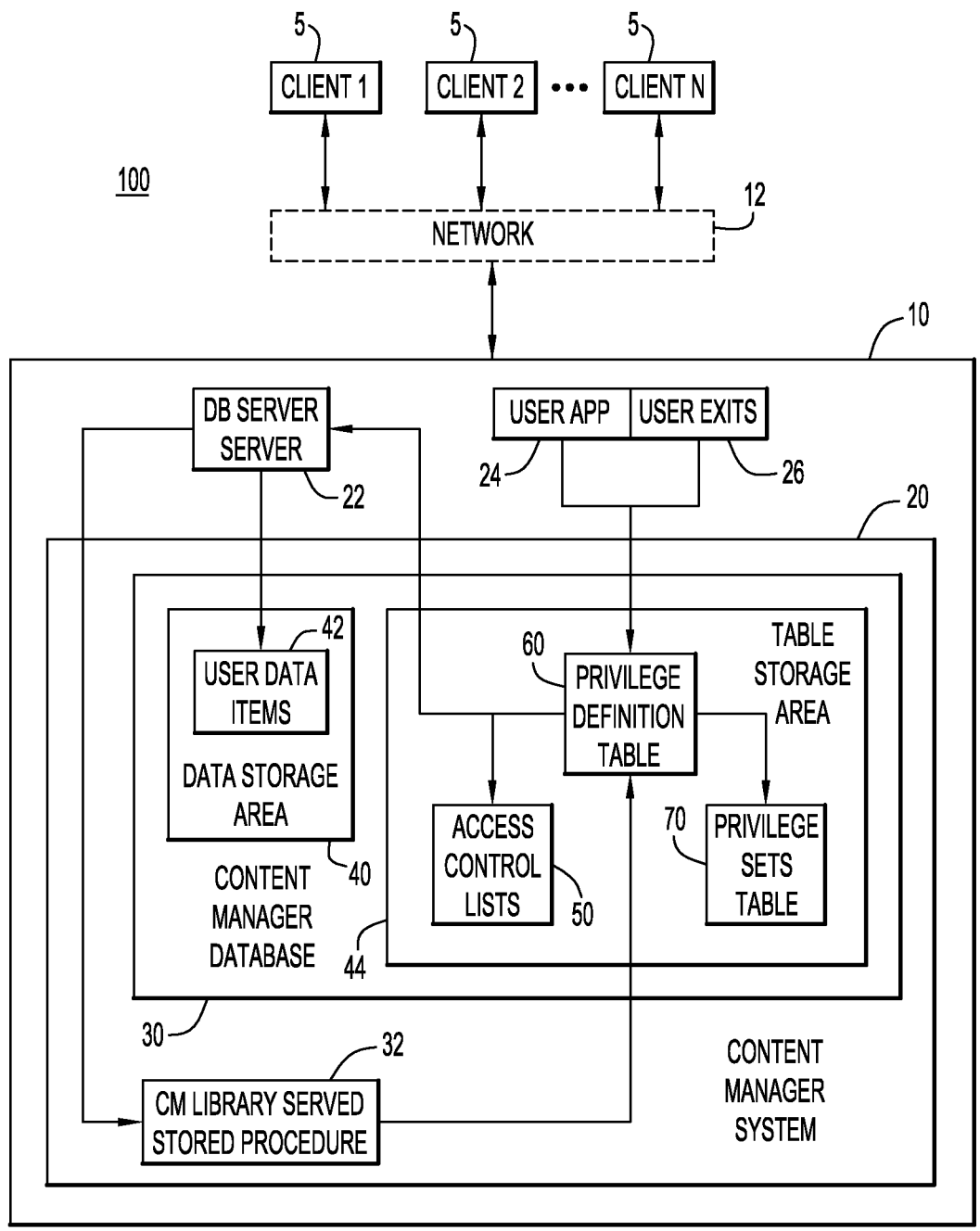
FIG. 1 is a block diagram illustrating an exemplary content management system according to an embodiment of the present invention.

Referring now to the Figures, an exemplary content management environment 100 according to embodiments of the present invention is illustrated in FIG. 1. The exemplary environment 100 comprises user clients 5, which are connected through network 12 to a server 10. Although the system depicted is a client-server system, it is understood that the content management system is not so limited, and can be implemented as a virtual desktop system, in a cloud, data center, distributed network, storage area network (SAN), or in any other suitable system, for example in a system designed for the provision of Software-as-a-Service (SaaS), such as a cloud data center or hosted web service.

Network 12 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the content management environment 100 may include any conventional or other communications devices to communicate over the networks via any conventional or other protocols, and may utilize any type of connection (e.g., wired, wireless, etc.) for access to the network.

The server 10 comprises a content manager system 20, a database server 22, user applications 24 and exits 26. Content manager (CM) system 20 includes content manager database 30 and stored procedures 32, which procedures 32, among other things, define the methods and tasks executed by CM system 20 with respect to the tables of database 30. System database 30 includes a data storage area 40 storing content manager controlled entities such as user data items 42, collections or libraries (not shown) of user data items, and a table storage area 44 storing various tables such as access control lists 50, a privileges table 60, a privileges set table 70, and several other tables including those shown in FIG. 2.

Data storage area 40 and table storage area 44 may be implemented by any conventional or other memory or storage device, and may be volatile (e.g., RAM, cache, flash, etc.), or non-volatile (e.g., ROM, hard-disk, optical storage, etc.), and include any suitable storage capacity. The data storage area 40 and table storage area 44 may be, for example, one or more databases implemented on a solid state drive or in a RAM cloud.

User clients 5, server 10, CM system 20, database server 22, and content manager database 30, may each be implemented in the form of a processing system, or may be in the form of software. They can each be implemented by any quantity of conventional or other computer systems or devices, such as a computing blade or blade server, thin client, computer terminal or workstation, personal computer (e.g., IBM-compatible PC, Apple Mac, tablet, laptop, netbook, etc.), cellular phone or personal data assistant (e.g., Palm Pre, Droid, iPhone, etc.), or any other suitable device. A processing system may include any commercially available operating system (e.g., AIX, Android, Linux, OSX, Sun Solaris, Unix, Windows, etc.) and any commercially available or custom software (e.g., browser software, communications software, word processing software, etc.). These systems may include processors, memories, internal or external communications devices (e.g., modem, network card, etc.), displays, and input devices (e.g., physical keyboard, touch screen, mouse, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

CM system 20, and the content management environment 100 as a whole, may include additional servers, clients, and other devices not shown, and individual components of the system may occur either singly or in multiples, for example, there may be more than one server 10 in the system, or for example, the functionality of various components may be combined into a single device or split among multiple devices. The server 10 may also be a node, for example a node in a computing cluster, which is connected to other nodes by suitable means, for example via a network. It is understood that any of the various components of the environment 100 may be local to one another, or may be remote from and in communication with one or more other components via any suitable means, for example a network such as a WAN, a LAN, Internet, Intranet, mobile wireless, etc.

Figures 2, 3:
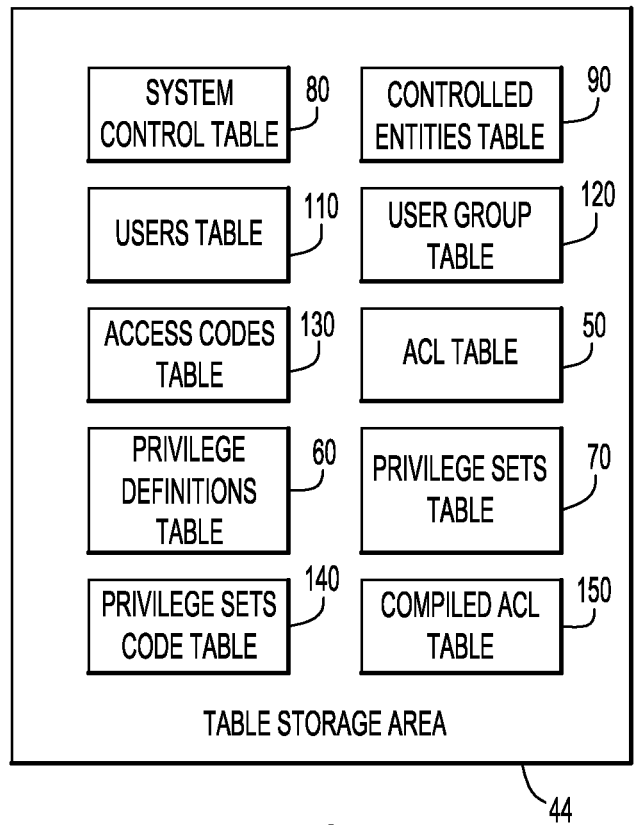
FIG. 2 is a block diagram illustrating various database tables for use in an exemplary content management system according to an embodiment of the present invention.
FIG. 3 illustrates a system control table 80 according to an embodiment of the present invention.

Referring to FIG. 2, access to entities (e.g., data items 42) is managed through the use of several relational database tables, including in this preferred embodiment of the invention system control table 80, controlled entities table 90, users table 110, user groups table 120, access codes table 130, access control list table 50, privilege definitions table 60, privilege sets table 70, privilege sets code table 140, and compiled ACL table 150. These tables are stored in table storage area 44 of the CM database 30, and are further described with reference to FIGS. 3 through 11.

Referring to FIG. 3, system control table 80 stores system configuration parameters for CM library server 20. Columns of table 80 include database name 81, ACL binding level 82, library ACL code 83, public access enabled flag 84, and allow trusted logon 85. Database name 81, an installation parameter, is the name of the database (library) server 22. ACL binding level 82 is the access control level used to control access to a CM controlled entity and having, as valid values, 0 at item type level (default), 1 at item level, 2 at mixed item and item type level, and 3 at entire library level. Therefore, depending on how the ACL binding level is set, the access may be controlled at a higher level (e.g., the entity is a library) or a lower and more granular level (e.g., the entity is an item). Library ACL code 83 contains the ACL to be associated with all CM item types and items 42 if the parameter ACL binding level 82 is configured at library level. Public access enabled flag 84 indicates whether the capability of opening a bound entity to public is enabled. When this column 84 is updated, system 20 rebuilds compiled ACL tables 150 and recreates all database table 30 views. Allow trusted logon 85 indicates whether users are permitted to use a trusted logon process to access the database.

Referring to FIG. 4, users table 110 maintains a catalog of individual users and user groups. Individual users can belong to none or any number of groups. Users must be assigned a number of privileges, stored in privilege set code table 130. Defining new CM users does not guarantee their existence in the database management system (DBMS) and the operating system. The system administrator ensures the usefulness of the CM users she creates. A group is a number of zero or more users, usually with the same job description, and assigned the same privilege set. A group cannot belong to other groups. A group does not hold default privileges for its members, nor do they relate to database management system (DBMS) or operating system groups. Defining groups minimizes the effort required to administer access control lists.

In the exemplary user table 110 depicted in FIG. 4, there is an entry or row 111 for each user, and columns including user ID 112, user number 113, user kind 114, user privilege set code 115, grant privilege set code 116, default ACL code 117, password 118, and user name 119. User ID 112 is the ID of the individual user or group. For an individual user, user ID 112 should match her DBMS user ID. The CM system 20 uses this value for user authentication and access control. For a group, user ID 112 contains the group name. User number (UNUM) 113 is a number assigned to each user (individual or group). User kind 114 indicates whether this entry 111 represents an individual user or a group. User privilege set code 115 denotes the user privileges for this user entry 111. The privilege set must be defined first, and this value is not valid for groups. It is set to 1 by CM system 20 for groups. User privilege set code 115 may be updated. Grant privilege set code 116 is the code assigned to new users by a user who is authorized to create users but not grant privileges to the new users. This value 116 is not valid for groups, and it can be updated. A system administrator GUI for creating a user must have an entry field for that user's grant privilege set code 115. Default ACL code 117 is used to associate with data items 42 when the access control is configured at item level if the user does not provide an ACL code when she creates data items 42. Password 118 is the encrypted user password, and user name 119 is the full name of this user or group.

Referring to FIG. 5, users group table 120 maintains associations of individual users with groups. An individual user can belong to none or any number of groups, but a group cannot belong to other groups. When an individual user is associated with a group, the user is said to be a member of that group. The exemplary user group table 120 depicted in FIG. 5 has an entry or row 121 for each individual user's membership in a particular group, and columns for individual user ID 122, individual user number (UNUM) 123, group user ID 124, and group user number (UNUM) 125. For example, the first row 121 in the table indicates that user "J_DOE" having individual UNUM "1000" is a member of group "ADMIN" having group UNUM "2", and the fourth and fifth rows 121 in the table indicate that user "J_TAYLOR" having individual UNUM "1004" is a member of the "R&D" and "PROJX" groups having group UNUMs "1005" and "1006", respectively. The association of individual users with groups simplifies access control management, because when access control specifications are defined, a group can be granted a number of privileges that apply to all group members, instead of an administrator having to separately assign the same privileges to each individual user. Each user and group appearing in the user group table 120 must be defined in users table 110 before an association in user group table 120 can be made between the individual user ID 122 and the group ID 124. Rows in this table can only be deleted, not updated.

Referring to FIG. 6, access codes table 130 maintains the access control list codes (identifiers) 132. The exemplary access codes table 130 depicted in FIG. 6 has an entry or row 131 for each access control list, and a column for a unique ACL code (or identifier) 132 that is generated by CM system 20 and cannot be updated. The list specifications are stored in the access control list table 50. ACL name 133 and ACL description 134 are defined in a separate keywords table (not shown). For purposes of illustration only, FIG. 6 depicts a list of pre-configured ACL codes 132.

Referring to FIG. 7, access control list table 50 (also called the ACL Table or AC Lists Table) maintains specifications for one or more access control lists, which are used by the access control algorithm to determine a user's access rights for a data item 42 or other entity. An access control list (ACL) may contain more than one access control (ACL) rule 51, and comprises all rows 51 having the same ACL code 132. Each control 51 is composed of two elements: who (user ID 112, user kind 114) can perform what (privilege set code 72). Each CM data entity (e.g., an item 42) must be bound to a control list in table 50. The control specifications 51 then will be enforced when entities are accessed. For purposes of illustration only, FIG. 7 depicts a list of pre-configured ACLs.

The exemplary ACL table 50 depicted in FIG. 7 has an entry or row 51 for each access control (ACL) rule, and columns for user kind 114, user ID 112, ACL code 132, and privilege set code 72. User ID 112 contains the ID for an individual user or group, and user kind 114 interprets the User ID column as public, group, or individual. If user kind 114 is public, the value in user ID column 112 is ignored. The corresponding types of ACL rules, for illustration purposes, can be given the names ACL rule 51 for user (user kind 114=user), ACL rule 51 for group (user kind 114=group), and ACL rule 51 for public (user kind 114=public), respectively. By specifying public, the ACL rule for public authorizes all the users to perform operations specified in the ACL code 132 on the bound entity, provided the users pass their user privileges check on ACL table 50. The ACL privileges on the bound entity to public (user kind 114=public) can be configured in system level. The configuration parameter is named public access enabled (defined in system control table 80 column 84). The ACL code 132 is the identifier of an individual access control list. Privilege set code 72 is the privilege set identifier, which indicates the operations allowed for the bound entity (e.g., data item 42).

Referring to FIG. 8, privileges definitions table 60 maintains an unlimited number of CM privilege definitions 61, including system-defined system administration privileges 62, system-defined data access privileges 63, and user-defined privileges 64. System defined privileges 62, 63 cannot be modified. Each privilege 61 has a system generated unique privilege definition code 65 as a primary key. Codes 0 to 999 are reserved to store system-defined privileges 62, 63, and codes 1000 and up are open for user defined privileges 64. When defining or updating privilege sets, this privilege definitions table 60 can be first queried to list all defined privileges 61, 62, 63, 64. Applications 24 can also query the privilege definitions table 60 at runtime to get the definitions of the connected user's privileges and customize the application menu selections specifically suitable for that user (at client workstation 5). Privilege name and description are defined in a keywords table (not shown). For purposes of illustration only, FIG. 8 depicts a list of privilege definitions 61 and their corresponding privilege definition codes 65, privilege definition names 66 and privilege definition descriptions 67.

Referring to FIG. 9, privilege sets table 70 maintains associations of individual privileges into privilege sets. Rows 71 with the same privilege set code 72 form a privilege set 141. Rows 71 in the privilege set table 70 can only be deleted, not updated. Columns in privilege sets table 70 include privilege set code 72, which identifies a particular privilege set, and privilege definition code 65. Privilege set name 73 and privilege definition name 66 description are defined in a keywords table (not shown). For purposes of illustration only, FIG. 9 depicts a list of privilege sets and their corresponding privilege set codes 72, privilege set names 73, privilege definition codes 65, and privilege definition names 66.

Referring to FIG. 10, privilege sets code table 140 maintains privilege set definitions. A privilege set 141 is uniquely identified by a system generated privilege set code 72, and comprises an unlimited number of privileges. Its set member associations are stored in privilege sets table 70. Privilege set name 73 and privilege set description 142 are defined in a keywords table (not shown). For purposes of illustration only, FIG. 10 depicts a list of pre-configured privilege sets and their corresponding privilege set codes 72, privilege set names 73, and privilege set descriptions 142.

Referring to FIG. 11, compiled ACL table 150 contains the compiled access control information. Columns in table 150 include user number (UNUM) 113, user kind 114, ACL code 132, privilege set code 72, privilege bits 152, group flag 153, and read privilege flag 154. For each row 151 in compiled ACL table 150, the privilege bits 152 column contains a privilege definition code 65 for each privilege in a particular set for access to a bound entity (e.g., data item 42). ACL code 132 is the access control list code, and the privilege definition codes 65 indicate the operations allowed for the bound entity. Privilege set code 72 is the privilege set code that the resolved privileges are derived from. This is a maintenance field, designed for incremental refresh on this table. For example, when a privilege set 141 is modified, rows 151 with the corresponding privilege set code 72 are affected, while other rows 151 are not. UNUM 113 contains the user number of an authorized user or group, and group flag 153 is set if the entry 151 is derived from an ACL rule for group. This column 153 provides a maintenance field, designed for incremental refresh. It contains null if the ACL rule user kind 114 is not for group. User kind 114 indicates which ACL rule type this row 151 is derived from: public, group or individual user. Read privilege flag 154 indicates whether or not the particular ACL code 132 and privilege set code 72 are associated with a read privilege or not.

Compiled ACL table 150 contains resolved access control information, meaning that each row in the table represents an authorized privilege (privilege bits 152—intersected by user privileges 72 and ACL privileges 132) for a user (or group) that is defined in an ACL rule 50. Thus, privilege definition code 65 is determined if both user privilege (i.e, the general privilege 115) and the ACL privileges 51 show that this user is involved (authorized). In this manner, compiled ACL table 150 is built, as is further described with reference to FIG. 14.

As discussed previously, a CM controlled entity (e.g., data item 42) is bound to an access control list (ACL), which is a group of specific ACL rules 51 having the same ACL code 132. When associated with CM controlled entities, ACL rules 51 define the authorization of the bound entities and do not circumvent user privileges. The access controls are enforced in addition to the user privileges check. Within the same access control list, a user may be specified in more than one type of rule. The precedence of the three types, from highest to lowest, is ACL rule for public (user kind 114=public), ACL rule for user (user kind 114=user), and then ACL rule for group (user kind 114=group). When applying ACL checks, if any higher-precedence rule type passes, the authorization is resolved and the process stops, but if a rule fails, the checking process will continue onto the lower-precedence rule types. When a user is specified in more than one ACL rule of a particular type (e.g., group), the user is authorized by the union of all those rules.

When accessing an entity such as data item 42, this table 150 is joined on the entity's ACL code 132, constrained by the runtime user's number (UNUM) 113 and the desired privilege bits 152. If such a row exists in compiled ACL table 150, the operation on that entity is allowed. Otherwise, it is denied. That is, at runtime, compiled ACL table 150 will be joined by the ACL (i.e., ACL code 132) associated with the specific entity that is filtered out by (i.e, constrained or identified by) user number 113 and the desired privileges 65 in privilege bits column 152. In this manner, content manager 20 performs an ACL code 132 lookup in the compiled ACL table 150 with a given user number 113 and a desired privilege 65.

Table 1 is a pseudo-code representation of how an access lookup may be performed by the CM 20 to check if user 1010 has privileges to store a new entity using ACL 1001, which can stand alone or as a part of the process 300*a* described with reference to FIGS. 12A and 12B. Table 2 is a pseudo-code representation of how an access lookup may be performed by the CM 20 to check if user 1010 has privileges to query/retrieve an already stored entity using ACL 1001, which can stand alone or as a part of the process 300*b* described with reference to FIGS. 13A and 13B.

TABLE 1

Access Control Lookup (Update/Delete/Create Item)

```
SELECT PRIVS FROM ICMSTCOMPILEDACL ICMC
WHERE ACL = <input ACLCode> AND
    (UNUM = <InputUserNUM> AND
    (EXISTS (SELECT 1
        FROM ICMSTUSERGROUPS G
        WHERE G.UNUM = <InputUserNUM AND
        ICMC.UNUM = G.GNUM) AND
        NOT EXISTS (SELECT 1
        FROM ICMSTCOMPILEDACL C
        WHERE C.UNUM = <InputUserNUM> AND
            C.ACL = ICMC.ACL)))
UNION
SELECT PRIVS
    FROM ICMSTCOMPILEDACL
    WHERE ACL = <InputACLCode> AND
        UNUM = 1 // PUBLIC
```

TABLE 2

Access Control Lookup (Query/Retrieve Item)

```
SELECT ... FROM ...
WHERE ... EXISTS (SELECT 1 FROM ICMSTCOMPILEDACL
        WHERE ACLCODE = 1001
            and C.RPRIV = '1'
            and C.USERID = 1010)
    OR EXISTS (SELECT 1 FROM ICMSTCOMPILEDACL C,
    ICMSTUSERGROUP UG
        WHERE C.ACLCODE=1001
        and C.RPRIV='1'
        and UG.UNUM = C.UNUM
        and UG.UNUM = 1010)
```

The benefits of the present embodiments of the compiled ACL table include enhanced performance because a user may be authorized to access a data item or other data entity by reference to this single table 150 that compiles ACL information from a plurality of tables, without repetitive access to several system tables. Further, the use of a single row for a group of users as opposed to a row for each individual user reduces the size of the table significantly, allows database inserts/deletes to be faster, and reduces the size of index trees and data pages for the compiled ACL table 150. Thus, the present embodiments maximize performance of administration operations involving groups such as creating new ACLs with ACL rules for groups, adding or removing users from groups, or removing ACL rules for groups, because each of these operations affects at most a single row of the compiled ACL table 150 (and in the case of changing user membership in groups, will not affect any rows). Particularly in the case of large database systems with hundreds or thousands of users, the ability to change at most a single row instead of hundreds or thousands of rows each time an ACL rule is changed for a particular group is a significant performance enhancement.

Figure 12A:
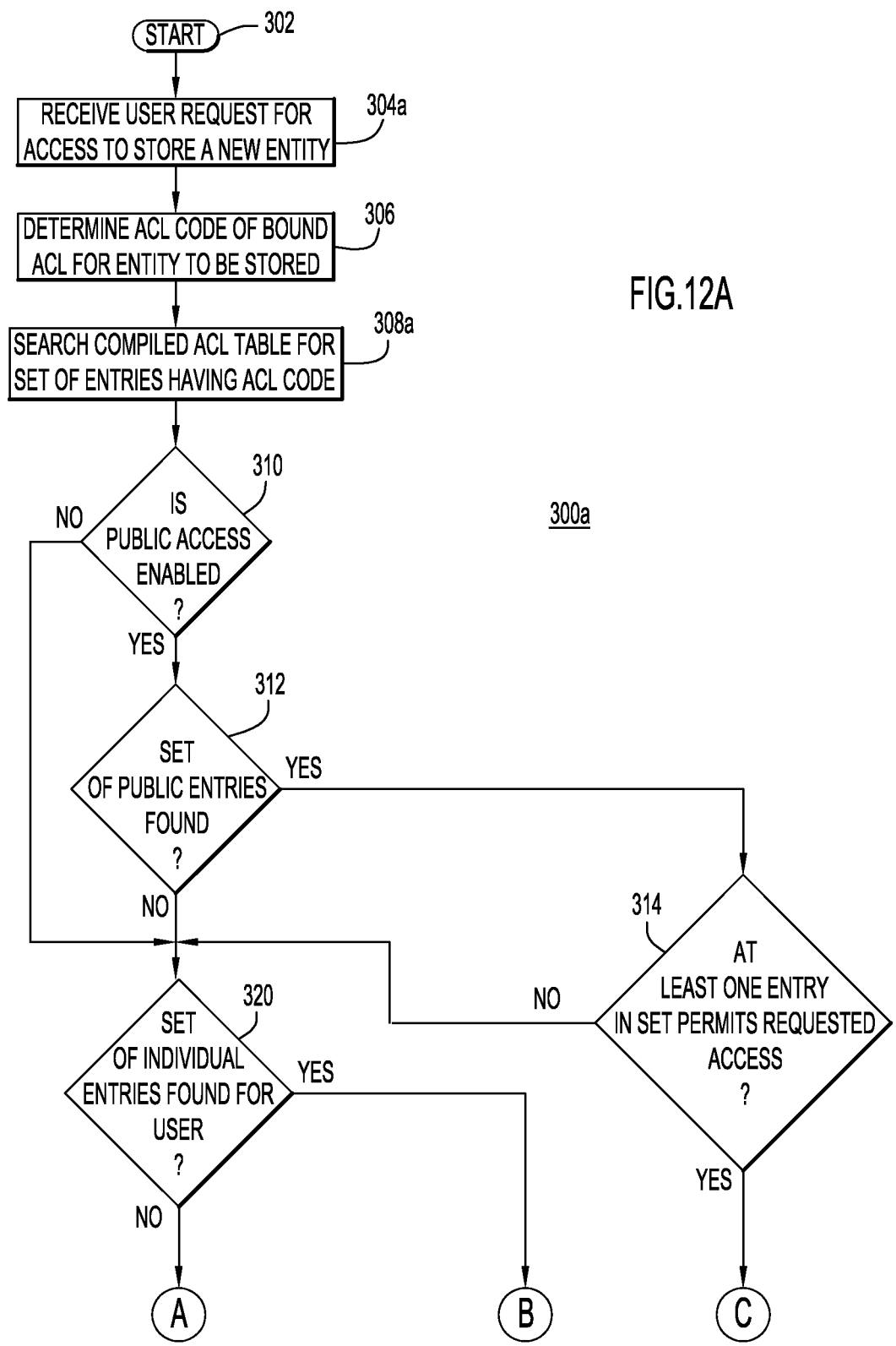
FIGS. 12A and 12B are flowcharts depicting an exemplary process of authorizing user access to store an entity according to an embodiment of the present invention.
Figure 12B:
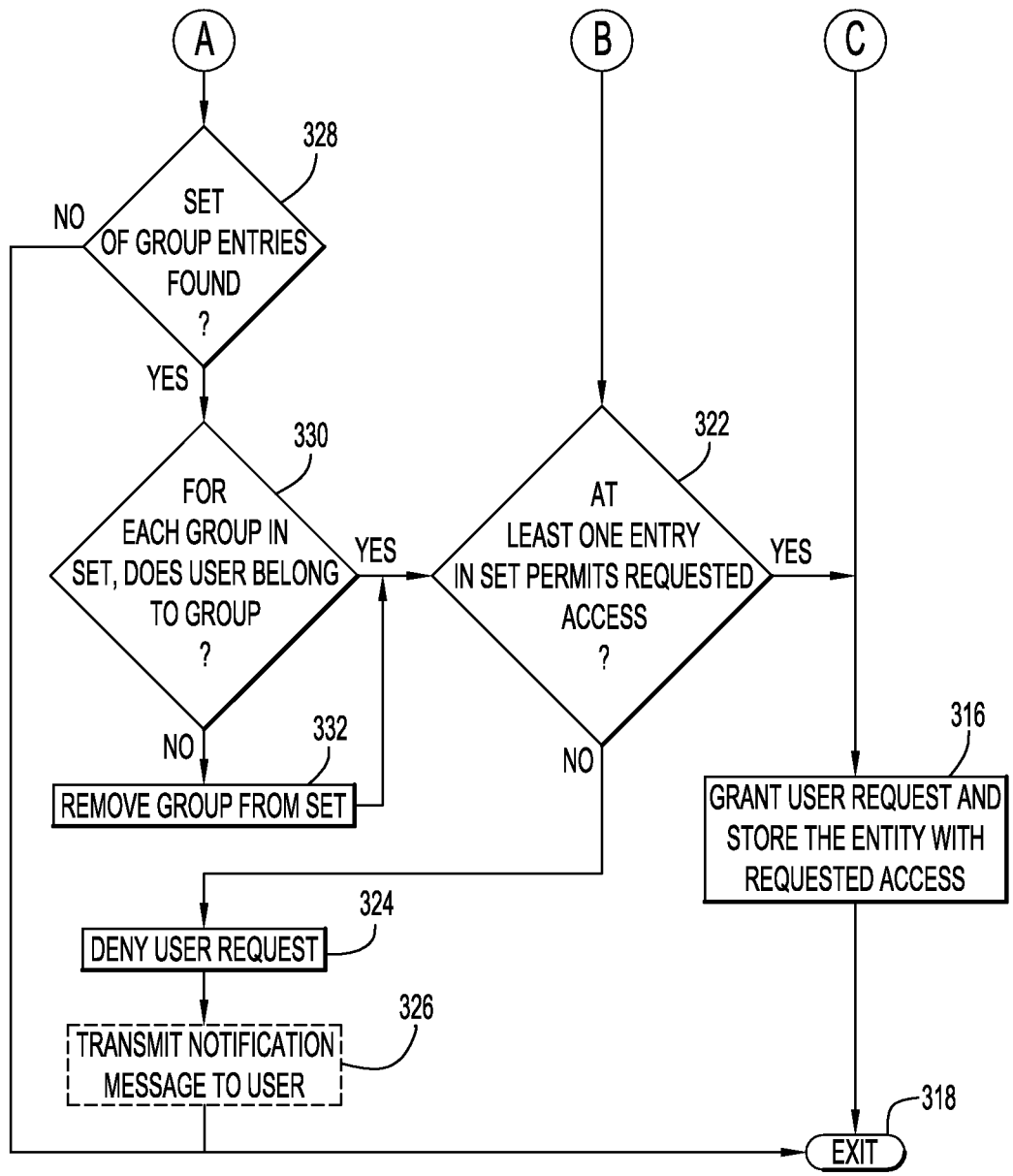
Figure 13A:
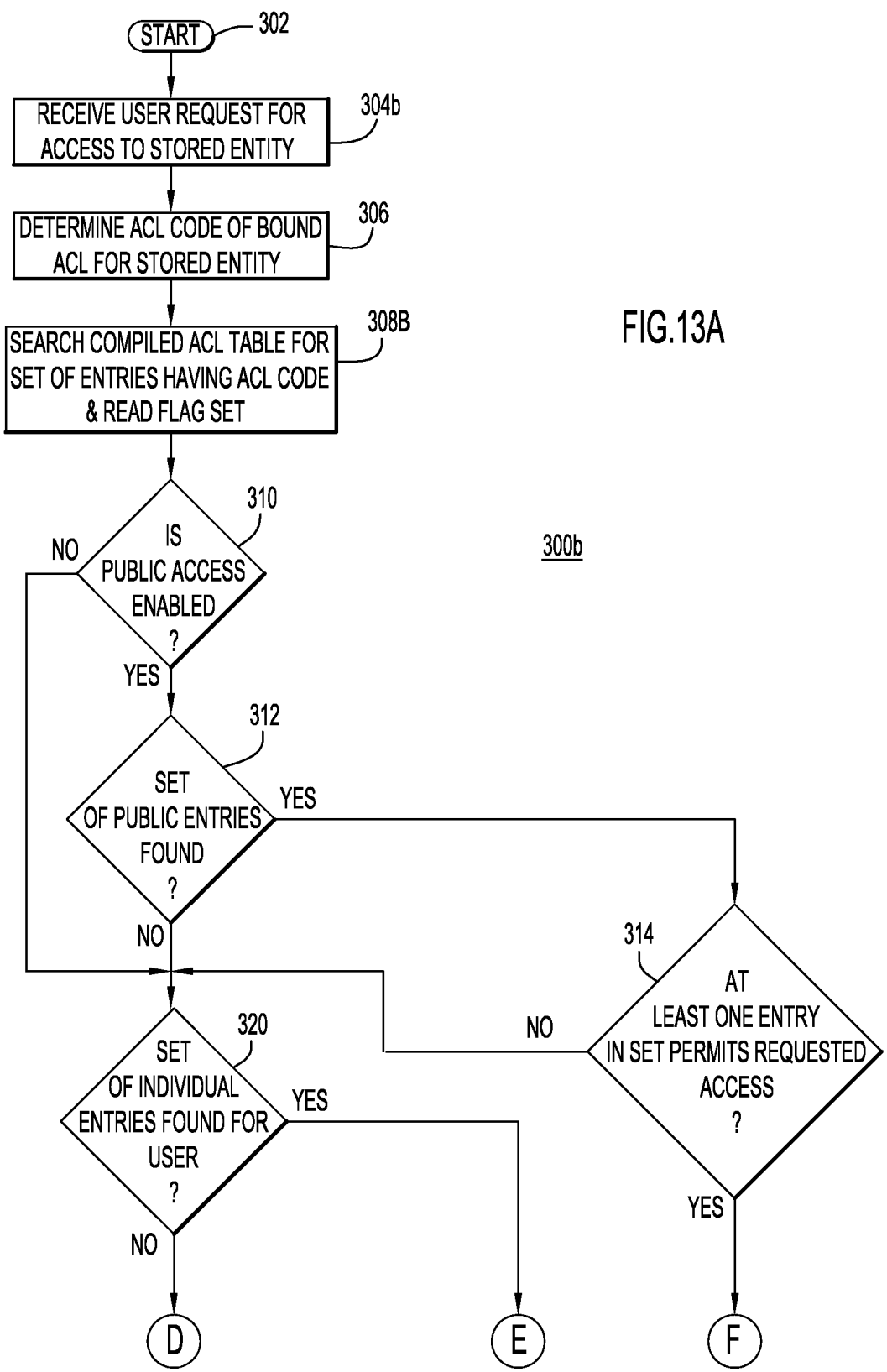
FIGS. 13A and 13B are flowcharts depicting an exemplary process of authorizing user access to query/retrieve a stored entity according to an embodiment of the present invention.
Figure 13B:
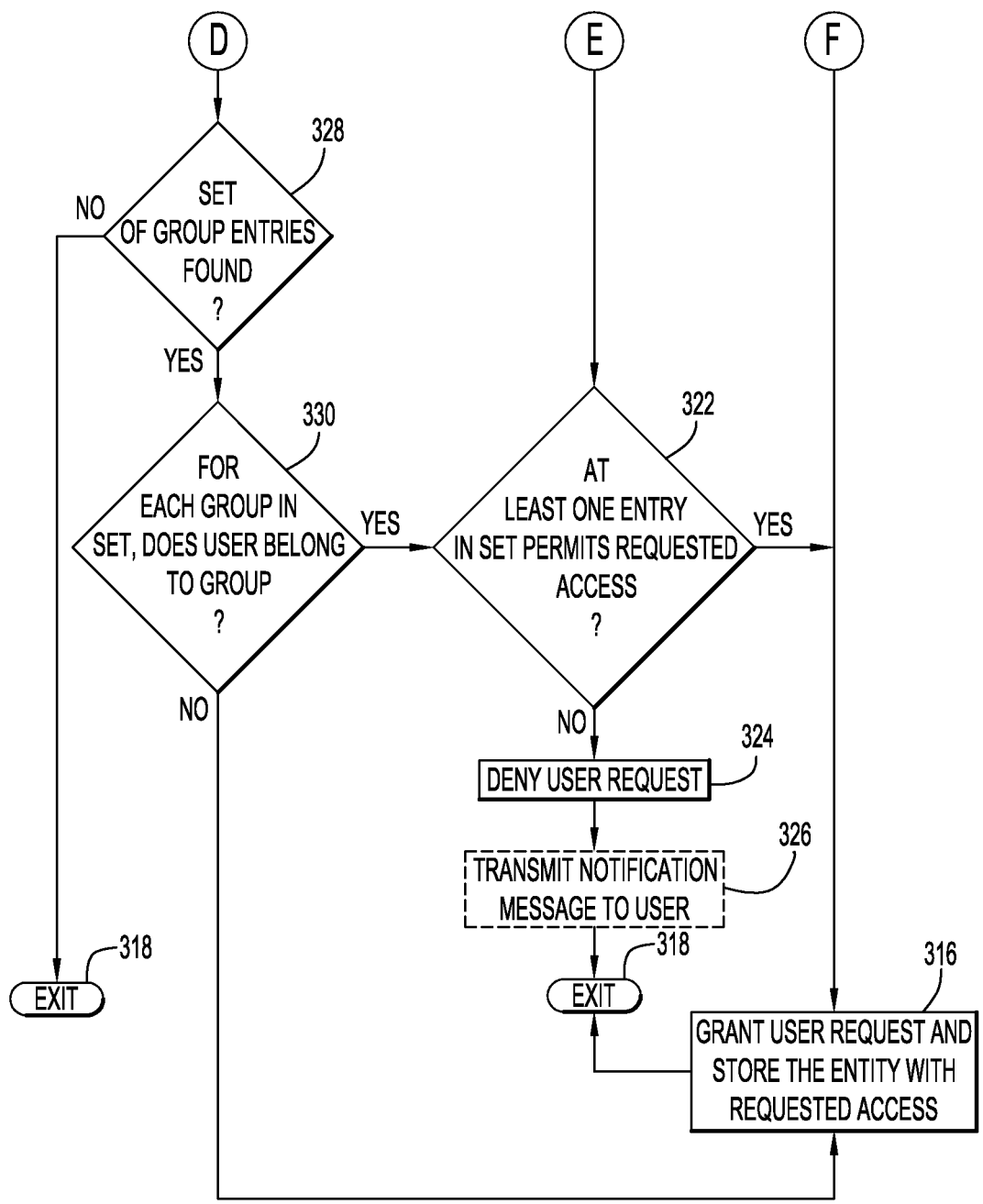

Referring now to FIGS. 12 and 13, reference numerals 300a, 300b generally designate flowcharts depicting a process of authorizing user access to store (FIGS. 12A and 12B) or query/retrieve a stored entity (FIGS. 13A and 13B), which may be carried out by the content management system 20 previously described. The processes differ slightly in steps 304, 308 and after step 330, but otherwise are the same.

At step 302 in FIGS. 12A and 13A, the process 300 begins, and at step 304 the CM system 20 receives a user request for access to a stored data entity. In process 300a, step 304a is the receipt of a request to store a new data entity, and in process 300b, step 304b is the receipt of a request to access an existing data entity already stored in the system. In step 306, the system determines the ACL code 132 of the bound ACL, that is, the ACL list that is bound to the stored data entity, and in step 308 the system searches the compiled ACL table 150 for a set of one or more entries 151 having the ACL code 132 (steps 308a and 308b) and having the read flag set, i.e., the read privilege is yes (step 308b). In step 310, the system determines if public access to the stored data entity is enabled, for example by searching in the system control table 80 for the value of public access enabled flag 84. If the flag is set, meaning that public access is allowed, then the system proceeds to step 312. If the determination in step 310 is that public access is not enabled, i.e., the public access enabled flag 84 is off, then all the ACL rules for public are ignored during the access control process and the system proceeds to step 320.

In step 312, the system determines if any of the entries 151 located in step 308 are public entries, and if yes, proceeds to step 314 and determines if at least one of these public entries permits the requested access to the stored entity. If the determination in step 314 is yes, then the system in step 316 grants the user request and allows the user to access the stored entity, and exits process 300 in step 318. If the determination in step 314 is no, then the system proceeds to step 320. In step 320, the system determines if any of the entries 151 located in step 308 are individual entries, and if yes, proceeds to step 322 and determines if at least one of these entries permits the requested access to the stored entity. If the determination in step 322 is yes, then the system proceeds to step 316 as previously described, but if the determination in step 322 is no, then the system proceeds to step 324 and denies the user request, and in optional step 326 may transmit a notification message to the user. If the determination in step 320 is no, then the system proceeds to step 328.

In step 328 in FIGS. 12B and 13B, the system determines if any of the entries 151 located in step 308 are group entries, and if no, proceeds to step 318 and exits process 300. If the determination in step 328 is yes, then the system proceeds to step 330 and determines for each group entry in the found set, whether the user is a member. In process 300a (FIG. 12B), if the user is a member, then the system proceeds to step 322 as previously described, but if the user is not a member, then the system proceeds to step 332 and removes that group or groups from the set, and then proceeds to step 322 as previously described. In process 300b (FIG. 13B), if the user is a member, then the system proceeds to step 322 as previously described, but if the user is not a member, then the system proceeds to step 316 as previously described.

Referring now to FIGS. 14A through 14D, reference numeral 400 generally designates a flowchart depicting a an exemplary process of refreshing a compiled ACL table 150, which may be carried out by the content management system 20 previously described. As discussed previously, compiled ACL table 150 contains the compiled results of access control specifications and must be refreshed when there are changes to the access control system. Ideally, the refresh should occur spontaneously and transparently to the users. As such refresh may be time-costly, content manager system 20 provides both the on-line and off-line refresh mechanisms. There are two approaches for refreshing this table 150: total refresh and incremental refresh. Process 400 describes both types of refresh.

Figure 14A:
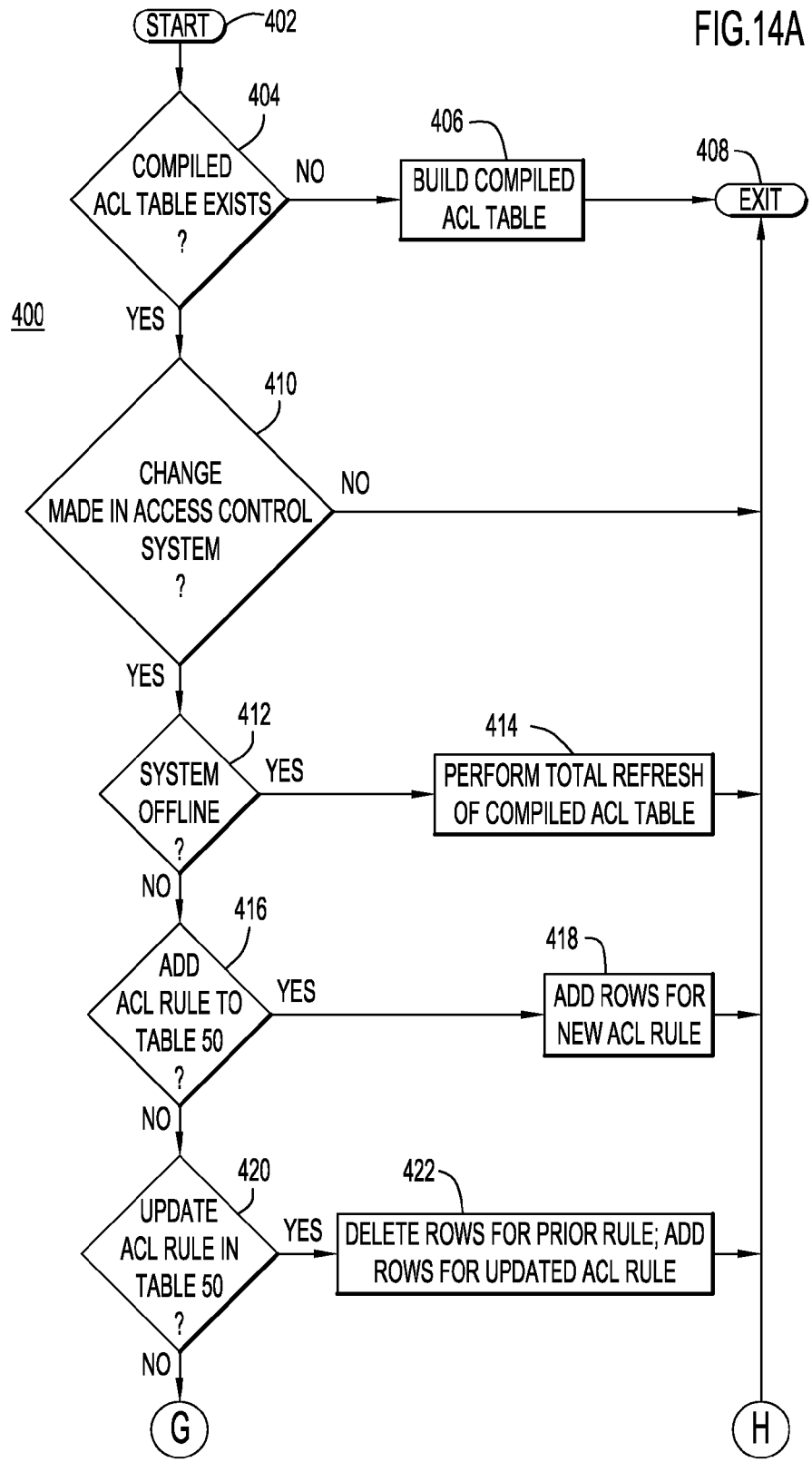
FIGS. 14A through 14D are flowcharts depicting an exemplary process of refreshing a compiled ACL table 150 according to an embodiment of the present invention.

At step 402 in FIG. 14A the process 400 begins, and at step 404 the CM system determines if the compiled ACL table exists already. If not, then the system proceeds to step 406 and builds the compiled ACL table and then exits the process 400 at step 408, but if yes, the system proceeds to step 410. At step 410, the CM system 20 determines if a change has been made in the access control system, e.g., if access control specifications or a configuration that affects the specifications have been changed. If no change was made, the system proceeds to step 408 and exits process 400.

If a change was made, then the CM system proceeds to step 412 and determines if the access control system is offline. If the access control system is offline, then the CM system proceeds to step 414 and performs a total refresh of the compiled ACL table and then exits the process 400 at step 408. If the access control system is online, then the CM system proceeds to step 416 and beyond to incrementally refresh the compiled ACL table.

Figure 15:
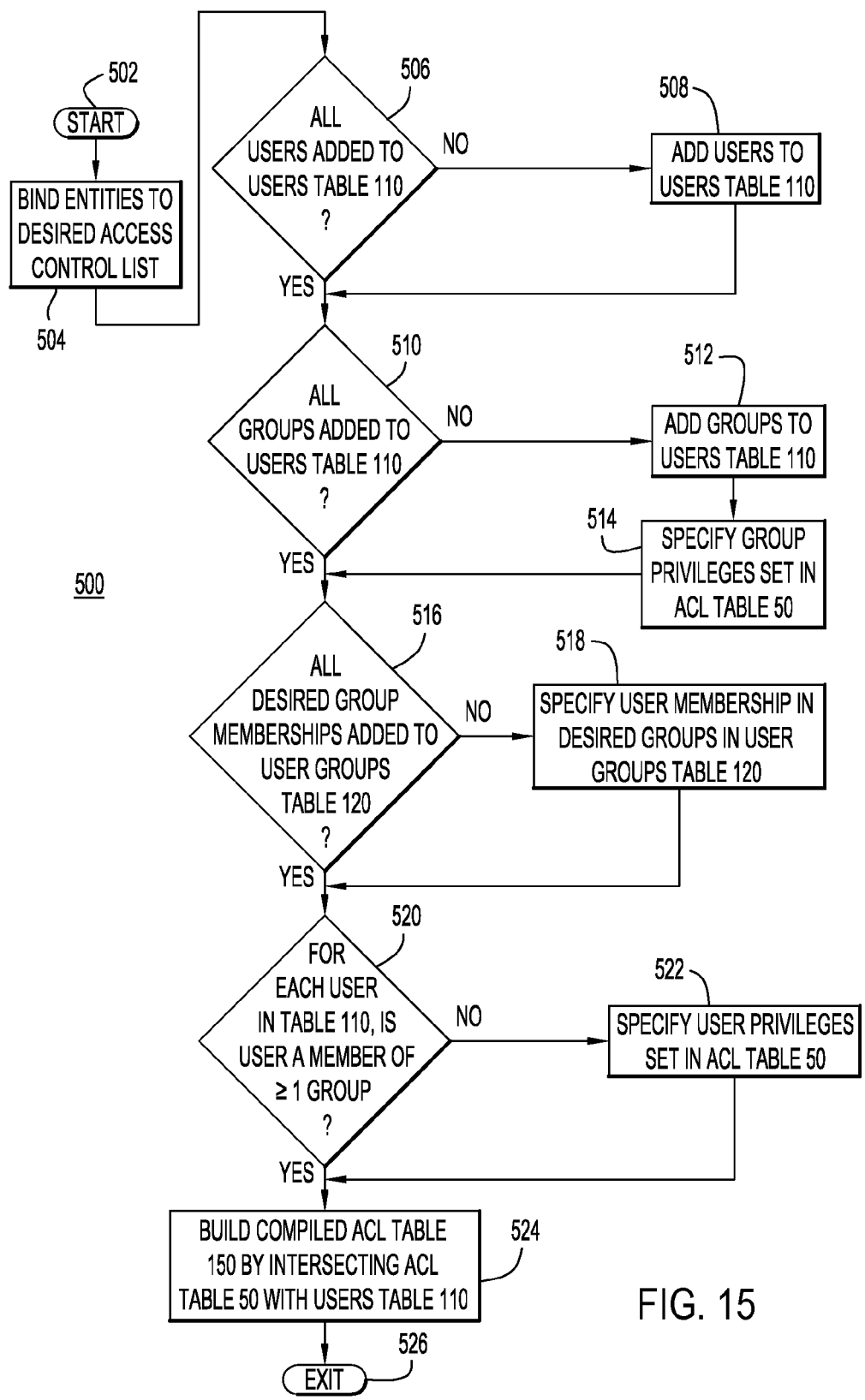
FIG. 15 is a flowchart depicting an exemplary process of building a compiled ACL table 150 according to an embodiment of the present invention.

A total refresh (or build) is desired for initial table population, migration and maintenance. It is straightforward in implementation, but time-consuming when executed. It is suitable for off-line execution. Table 2 is a pseudo-code representation of the access control algorithm for content manager controlled entities, and is initially executed during total refresh and building (steps 410 and 414). An exemplary process 500 for carrying out a build (or total refresh) of the compiled ACL table 150 is also depicted in FIG. 15. It is understood that any suitable process may be used to carry out the total refresh or build of steps 410 and 414, including but not limited to the process in Table 3 or the process 500.

TABLE 3

Access Control Algorithm for CM Controlled Entities get current user 112 privileges 72
if user privileges 72 allow the operation with super access capability
   return granted -- bypass ACL table 50 check
if user privileges 72 do not allow the operation return denied
now, already authorized by the user privileges get the Item's ACL code 132
try ACL rule 132 for public (user kind 114 = public)
first
if configuration parameter PubAccessEnabled is true
   for each ACL Rule in table 50 for public
      if ACL privileges 132 allow the operation return granted
   continue trying other types of rules
   if exists an ACL rule in table 50 for user for this user 115
   if ACL privileges 132 allow the operation return granted
   else
   return denied -- do not try any ACL Rule in table 50
for group (user kind 114 = group)
   else for each ACL rule in table 50 for group that contains the user 112
   if ACL privileges 132 allow the operation return granted return
denied -- either denied or user 112 is not qualified for any rule in table 50

This total refresh/build process is time consuming, and if it were it the only way to populate compiled ACL table 150, then the CM system would require that the compiled ACL table 150 be rebuilt whenever an update occurs in the relevant system tables, which include in this exemplary embodiment, system tables 50, 60, 70, 110, 120, 130, and 140. Instead, the present embodiments provide for an incremental refresh, which shortens the process time, but complicates the implementation. Because accounting for the access control specification changes for an off-line incremental refresh is a non-trivial task, this approach is generally only applied to on-line execution.

After the CM system completes the build (in step 406) or total refresh (in step 414) of the compiled ACL table, the system then exits the process 400 at step 408.

In step 416, the CM system begins the incremental refresh process. In step 416 the CM system determines if a new ACL rule 51 having ACL code 132 has been added into ACL table 50, and if yes then in step 418 the system adds a new entry or entries (rows 151) to compiled ACL table 150 for the users having user ID 112 in the new ACL rule 51, and then exits the process 400 at step 408. If no new ACL rule was added, then the system proceeds to step 420.

In step 420, the CM system determines if an existing ACL rule 51 in ACL table 50 has been changed or updated, and if yes, then in step 422 the system deletes each corresponding entry (row 151) in compiled ACL table 150, and replaces it with a new entry (row 151) with the changed information, and then exits the process 400 at step 408. The system may, for example, search for corresponding entries in table 150 using the ACL code 132 and user ID 112 specified in the deleted rule 51. If no update was made to an existing ACL rule, then the system proceeds to step 424.

Figure 14B:
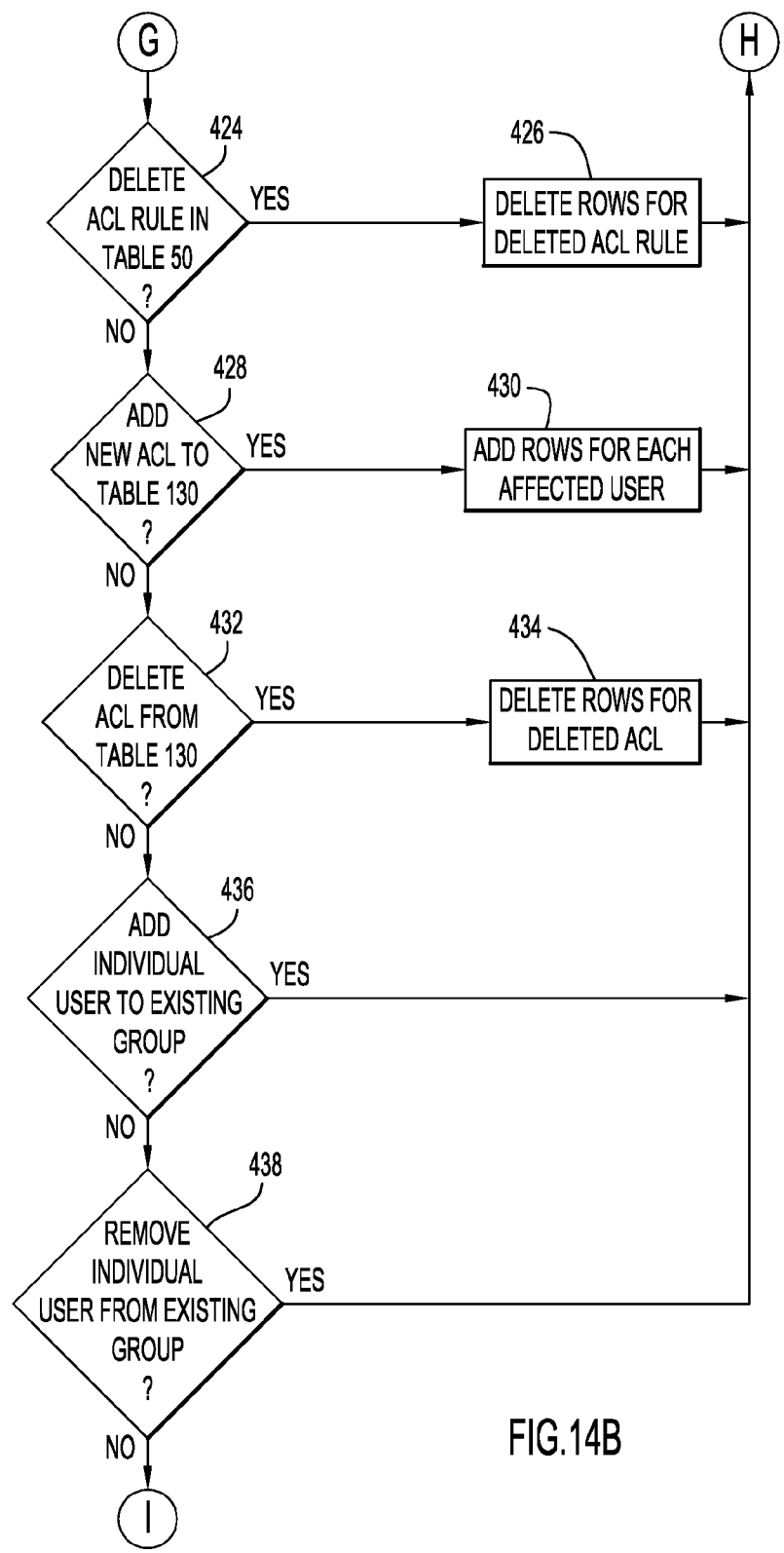

Referring now to FIG. 14B, in step 424 the CM system determines if an existing ACL rule 51 was deleted from the ACL table 50, and if yes the system in step 426 deletes each corresponding entry in compiled ACL table 150, and then exits the process 400 at step 408. The system may, for example, search for corresponding entries in table 150 using the ACL code 132 and user ID 112 specified in the deleted rule 51. If no deletion was made, then the system proceeds to step 428.

In step 428, the CM system determines if a new access control list 131 having an ACL code 132 was added to access codes table 130, and if yes, then in step 430 the system adds a new entry or entries (rows 151) to compiled ACL table 150 for each affected user, and then exits the process 400 at step 408. If no access control list was added, then the system proceeds to step 432. In step 432, the CM system determines if an existing access control list 131 having an ACL code 132 was deleted from access codes table 130, and if yes, then in step 434 the system deletes each corresponding entry in compiled ACL table 150, and then exits the process 400 at step 408. The system may, for example, search for corresponding entries in table 150 using the deleted ACL code 132. If no deletion was made, then the system proceeds to step 436.

In step 436, the CM system determines if an individual user having user ID 122 was added to a group having group user ID 124 in user group table 120. If yes, the CM system exits the process 400 at step 408, because no change is needed to the compiled ACL table 150. If no, the system proceeds to step 438. In step 438, the CM system determines if an individual user having user ID 122 was removed from a group having group user ID 124 in user group table 120. If yes, the CM system exits the process 400 at step 408, because no change is needed to the compiled ACL table 150. If no, the system proceeds to step 440.

Figure 14C:
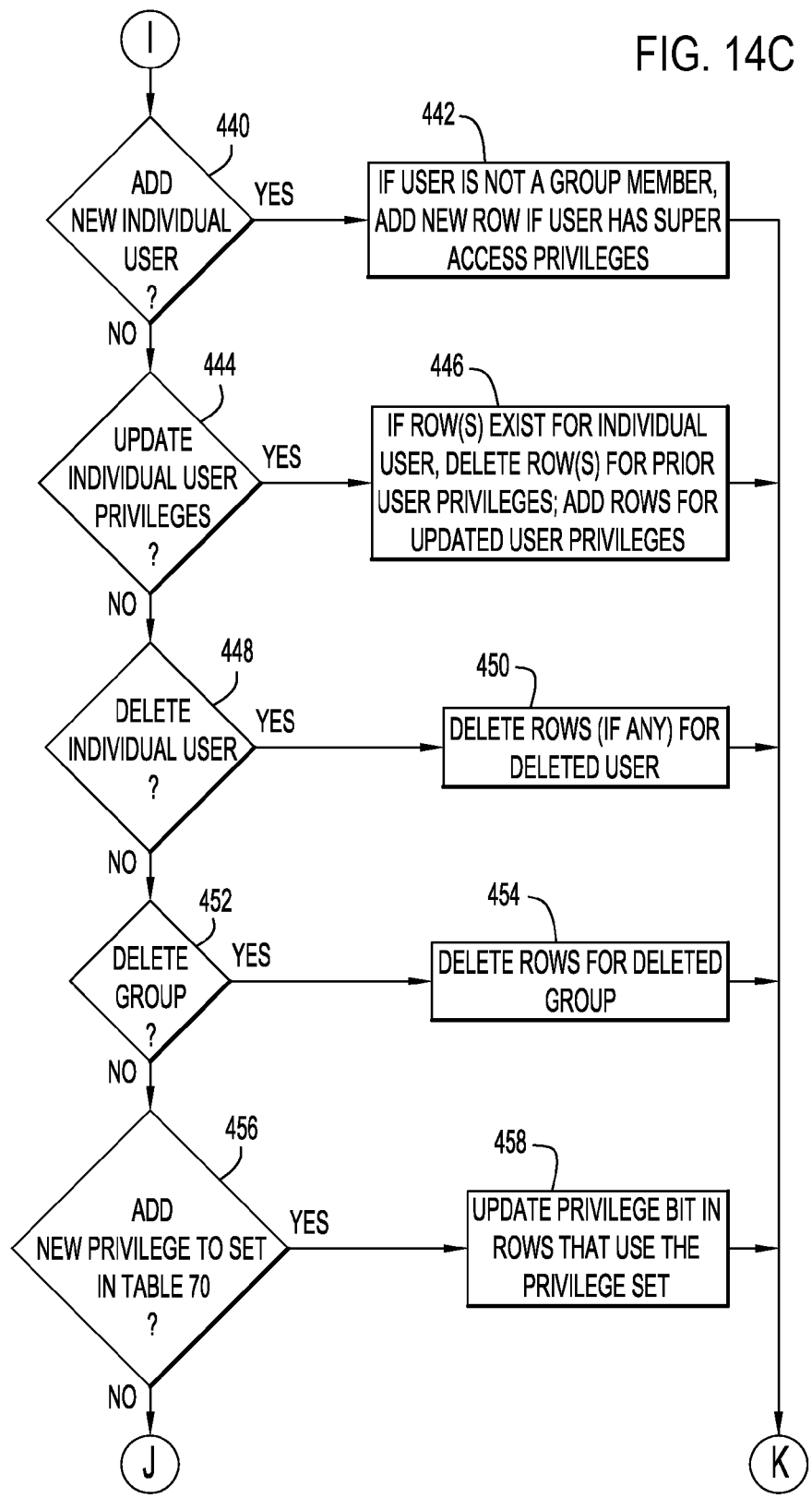

Referring now to FIG. 14C, at step 440 the CM system determines if a new individual user having user ID 112/122 was added to users table 110. If yes, the system in step 442 adds a new entry or entries (rows 151) to compiled ACL table 150 for the new user, if that user is not a group member and has super access capability privileges designated in user privilege set code 115, and then exits the process 400 at step 408. If no, the system proceeds to step 444.

At step 444 the CM system determines if an existing individual user having user ID 112/122 had her general privileges in user privilege set code 115 changed in users table 110. If yes, the system in step 446 deletes each corresponding entry in compiled ACL table 150 (if any exist), and then adds a new entry or entries (rows 151) to the compiled ACL table 150 to replace any deleted entry or entries, before exiting the process 400 at step 408. If no, the system proceeds to step 448. If the individual user 112/122 belongs to a group, then there will be no entries in compiled ACL table 150 to delete and replace.

At step 448 the CM system determines if an existing individual user 112/122 was deleted from the users table 110. If yes, the system in step 450 deletes each corresponding entry in compiled ACL table 150, and then exits the process 400 at step 408. The system may, for example, search for corresponding entries in compiled ACL table 150 using the user ID 112/122 of the deleted user. If the individual user 112/122 belongs to a group, then there will be no entries in compiled ACL table 150 to delete. If no, the system proceeds to step 452.

At step 452 the CM system determines if an existing group having user ID 112/124 (or a public group) was removed from the system user group table 120. If yes, the system in step 454 deletes each corresponding entry in compiled ACL table 150, and then exits the process 400 at step 408. The system may, for example, search for corresponding entries in compiled ACL table 150 using the user ID 112/124 of the deleted user group. If no, the system proceeds to step 456.

At step 456 the CM system determines if a new privilege set member 71 having privilege definition code 65 was added to an existing privilege set 72 in privilege sets table 70, and the existing privilege set 72 is used in any individual ACL rules 132. If yes, then in step 458 the system adds the new privilege code 65 to the privilege bit column 152 for each affected row 151 in compiled ACL table 150, and then exits the process 400 at step 408. The system may, for example, search for corresponding entries in compiled ACL table 150 using privilege set code 72 and privilege definition code 65. If no, the system proceeds to step 460.

Figure 14D:
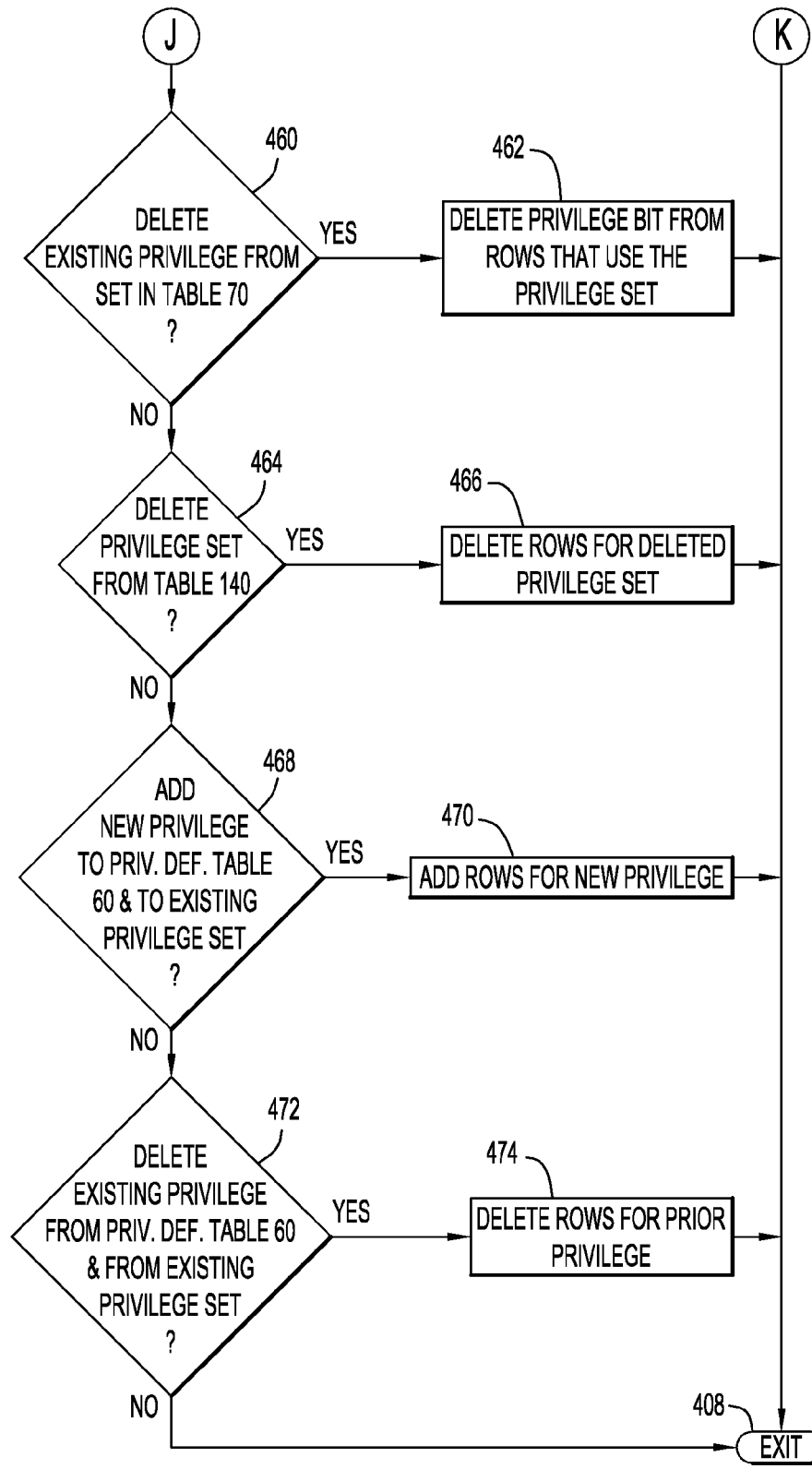

Referring now to FIG. 14D, at step 460 the CM system determines if an existing privilege set member 71 having privilege definition code 65 was deleted from an existing privilege set 72 in privilege sets table 70, and the existing privilege set 72 is used in any individual ACL rules 132. If yes, then in step 462 the system deletes each corresponding privilege code 65 from the privilege bit column 152 for each affected row 151 in compiled ACL table 150 and then exits the process 400 at step 408. The system may, for example, search for corresponding entries in compiled ACL table 150 using privilege set code 72 and privilege definition code 65. If no, the system proceeds to step 464.

At step 464, the CM system determines if an existing privilege set 141 having privilege set code 72 was deleted from privilege sets code table 140. If yes, then in step 466 the system deletes each corresponding entry in compiled ACL table 150, and then exits the process 400 at step 408. The system may, for example, search for corresponding entries in compiled ACL table 150 using deleted privilege set code 72. If no, the system proceeds to step 468.

At step 468, the CM system determines if a new privilege 61 having privilege definition code 65 was added to privilege definitions table 60, and was added to an existing privilege set having privilege set code 72 in privilege set table 70. If yes, then in step 470 the system adds a new entry or entries (rows 151) to compiled ACL table 150, and then exits the process 400 at step 408. For example, the exemplary system pre-defined privilege set named "AllPrivSet" includes every privilege, and thus a new entry for the new privilege 61 will be added to the compiled ACL table 150 each time the "AllPrivSet" privilege set appears in compiled ACL table 150. If no, the system proceeds to step 472.

At step 472, the CM system determines if an existing privilege 61 having privilege definition code 65 was deleted from privilege definitions table 60, and was a member of an existing privilege set having privilege set code 72 in privilege set table 70. If yes, then in step 474 the system deletes each corresponding entry in compiled ACL table 150m and then exits the process 400 at step 408. For example, the exemplary system pre-defined privilege set named "AllPrivSet" includes every privilege, and thus the removal of a privilege 61 necessitates a deletion of the corresponding entry in the compiled ACL table 150 each time the "AllPrivSet" privilege set appears in compiled ACL table 150. If no, the system then exits the process 400 at step 408.

Referring now to FIG. 15, reference numeral 500 generally designates a flowchart depicting a an exemplary process of building (or performing a total refresh of) a compiled ACL table 150, which may be carried out by the content management system 20 previously described. The process 500 is simplified for the sake of illustrative purposes, and is not limited to the steps depicted and described, which focus on several aspects of the build process.

At step 502 in FIG. 15 the process 500 begins, and at step 504 the CM system binds each stored data entity to the desired access control list. In step 506, the system determines if all desired users have been added to users table 110, and if not, in step 508 adds the user or users to the users table 110, and then proceeds to step 510. If the determination in step 506 is yes, then the system proceeds to step 510. In step 510, the system determines if all desired groups have been added to users table 110, and if not, in step 512 adds the group or groups to the users table 110, and in step 514 specifies a set of group privileges for each group in ACL table 50, and then proceeds to step 516. If the determination in step 510 is yes, then the system proceeds to step 516.

In step 516, the system determines if all desired group memberships have been added to user groups table 120. If not, the system in step 518 specifies user membership in desired groups in user groups table 120, for example by adding a row for each individual user's membership in each desired group, and then proceeds to step 520. If the determination in step 516 is yes, then the system proceeds to step 520. In step 520, the system determines, for each user in users table 110, if the user is a member of one or more groups, and if not, in step 522 specifies a set of user privileges for each such user in the ACL table 50, and then proceeds to step 524. If the determination in step 520 is yes, then the system proceeds to step 524.

In step 524, the system builds the compiled ACL table 150 by intersecting the ACL table 50 with the users table 110 (and any other desired table). As described previously with reference to FIG. 11, the columns of the ACL table including user number 113, user kind 114, ACL code 132, a privilege set code 72, privilege bits 152 including one or more privilege definition codes 65, a group flag 153, and a read flag 154. As can be understood from the description of process 500, the rows of the ACL table each correspond to either a user group, or an individual user that is a member of zero groups (because only such individual users have a set of privileges defined in ACL table 50). Thus, if an individual user is a member of one or more groups, there will not be any rows in the ACL table corresponding to such users. Instead, a user who is a group member will have her privileges determined by the group or groups to which she belongs. It is also understood that a set of privileges 72 is represented by a row in the compiled ACL table 150. Thus, if a particular group has a set of group privileges including five different privileges, then there will be five corresponding privilege definition codes 65 in the privilege bit column 152 for that row.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Java, P1/1, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method comprising:
generating, by a processor, a compiled access control list from a plurality of access control lists, one or more sets of group privileges, a set of user information, and one or more sets of user privileges, wherein the compiled access control list includes for each entry a privilege flag indicating a presence of a read privilege in a set of privileges associated with that entry, and wherein the compiled access control list lacks entries for individual group members and includes at least one user group and at least one individual user lacking membership in a group;
responsive to a modification of a number of members within the at least one user group, making no change to the compiled access control list; and
processing, by the processor, a request to permit access to a data object based on one or more entries in the compiled access control list each associated with an access control list for the data object and including the privilege flag indicating the presence of the read privilege.

2. The computer implemented method of claim 1, further comprising:
deriving the compiled access control list from a set of relevant tables stored in memory; and
selectively updating the compiled access control list responsive to run time modification of the set of relevant tables.

3. The computer implemented method of claim 2, further comprising:
maintaining as one of the set of relevant tables a user groups table, columns of the user groups table comprising group user indicia and individual user identification indicia from the set of user information, and rows of the user groups table corresponding to an individual user that is a member of the at least one user group; and
responsive to insertion of a row in the user groups table, making no change to the compiled access control list.

4. The computer implemented method of claim 2, further comprising:
maintaining as one of the set of relevant tables a user groups table, columns of the user groups table comprising group user indicia and individual user identification indicia from the set of user information, and rows of the user groups table corresponding to an individual user that is a member of the at least one user group; and
responsive to deletion of a row from the user groups table, making no change to the compiled access control list.

5. The computer implemented method of claim 2, further comprising:
maintaining as one of the set of relevant tables an access codes table, the access codes table comprising code indicia uniquely identifying each of the plurality of access control lists; and
responsive to insertion of a code indicia into the access codes table that impacts an individual user who has super access capability and that is a member of zero user groups, inserting a corresponding entry into the compiled access control list.

6. The computer implemented method of claim 2, further comprising:
maintaining as one of the set of relevant tables a users table, columns of the users table comprising individual user identification indicia from the set of user information and corresponding user privilege set indicia for at least one individual user; and
maintaining as one of the set of relevant tables a user groups table, columns of the user groups table comprising group user indicia and individual user identification indicia from the set of user information, and rows of the user groups table corresponding to an individual user that is a member of the at least one user group.

7. The computer implemented method of claim 2, further comprising:
maintaining as one of the set of relevant tables a users table, columns of the users table comprising individual user identification indicia from the set of user information and corresponding user privilege set indicia for at least one individual user;
maintaining as one of the set of relevant tables a user groups table, columns of the user groups table comprising group user indicia and individual user identification indicia from the set of user information, and rows of the user groups table corresponding to an individual user that is a member of the at least one user group; and
responsive to updating of a row in the users table for an individual user who is a member of zero user groups and whose corresponding user privilege set indicia includes indicia of super access capability, updating corresponding entries in the compiled access control list for the individual user.

8. The computer implemented method of claim 1, further comprising:
identifying one or more user groups within the compiled access control list associated with an access control list for the request to permit access, wherein the request is received from a user; and
determining membership of the user within at least one of the identified one or more user groups with privileges to permit the access of the request.

9. A computer program product comprising:
a computer readable storage device having computer readable program code stored thereon, the computer readable program code comprising computer readable program code configured to:
generate a compiled access control list from a plurality of access control lists, one or more sets of group privileges, a set of user information, and one or more sets of user privileges, wherein the compiled access control list includes for each entry a privilege flag indicating a presence of a read privilege in a set of privileges associated with that entry, and wherein the compiled access control list lacks entries for individual group members and includes at least one user group and at least one individual user lacking membership in a group;
responsive to a modification of a number of members within the at least one user group, making no change to the compiled access control list; and
process a request to permit access to a data object based on one or more entries in the compiled access control list each associated with an access control list for the data object and including the privilege flag indicating the presence of the read privilege.

10. The computer program product of claim 9, wherein the computer readable program code is further configured to:
derive the compiled access control list from a set of relevant tables stored in memory; and
selectively update the compiled access control list responsive to run time modification of the set of relevant tables.

11. The computer program product of claim 10, wherein the computer readable program code is further configured to:
maintain as one of the set of relevant tables a user groups table, columns of the user groups table comprising group user indicia and individual user identification indicia from the set of user information, and rows of the user groups table corresponding to an individual user that is a member of the at least one user group; and
responsive to insertion of a row in the user groups table, make no change to the compiled access control list.

12. The computer program product of claim 10, wherein the computer readable program code is further configured to:
maintain as one of the set of relevant tables a user groups table, columns of the user groups table comprising group user indicia and individual user identification indicia from the set of user information, and rows of the user groups table corresponding to an individual user that is a member of the at least one user group; and
responsive to deletion of a row from the user groups table, make no change to the compiled access control list.

13. The computer program product of claim 10, wherein the computer readable program code is further configured to:
maintain as one of the set of relevant tables an access codes table, the access codes table comprising code indicia uniquely identifying each of the plurality of access control lists; and
responsive to insertion of a code indicia into the access codes table that impacts an individual user who has super access capability and that is a member of zero user groups, insert a corresponding entry into the compiled access control list.

14. The computer program product of claim 10, wherein the computer readable program code is further configured to:
maintain as one of the set of relevant tables a users table, columns of the users table comprising individual user identification indicia from the set of user information and corresponding user privilege set indicia for at least one individual user; and
maintain as one of the set of relevant tables a user groups table, columns of the user groups table comprising group user indicia and individual user identification indicia from the set of user information, and rows of the user groups table corresponding to an individual user that is a member of the at least one user group.

15. The computer program product of claim 10, wherein the computer readable program code is further configured to:
maintain as one of the set of relevant tables a users table, columns of the users table comprising individual user identification indicia from the set of user information and corresponding user privilege set indicia for at least one individual user;
maintain as one of the set of relevant tables a user groups table, columns of the user groups table comprising group user indicia and individual user identification indicia from the set of user information, and rows of the user groups table corresponding to an individual user that is a member of the at least one user group; and
responsive to updating of a row in the users table for an individual user who is a member of zero user groups and whose corresponding user privilege set indicia includes indicia of super access capability, update corresponding entries in the compiled access control list for the individual user.

16. A system comprising:
a hardware processor configured with logic to:
generate a compiled access control list from a plurality of access control lists, one or more sets of group privileges, a set of user information, and one or more sets of user privileges, wherein the compiled access control list includes for each entry a privilege flag indicating a presence of a read privilege in a set of privileges associated with that entry, and wherein the compiled access control list lacks entries for individual group members and includes at least one user group and at least one individual user lacking membership in a group;
responsive to a modification of a number of members within the at least one user group, making no change to the compiled access control list; and
process a request to permit access to a data object based on one or more entries in the compiled access control list each associated with an access control list for the data object and including the privilege flag indicating the presence of the read privilege.

17. The system of claim 16, wherein the hardware processor is further configured with logic to:
derive the compiled access control list from a set of relevant tables stored in memory; and
selectively update the compiled access control list responsive to run time modification of the set of relevant tables.

18. The system of claim 17, wherein the hardware processor is further configured with logic to:
maintain as one of the set of relevant tables a user groups table, columns of the user groups table comprising group user indicia and individual user identification indicia from the set of user information, and rows of the user groups table corresponding to an individual user that is a member of the at least one user group; and
responsive to insertion of a row in the user groups table, make no change to the compiled access control list.

19. The system of claim 17, wherein the hardware processor is further configured with logic to:
maintain as one of the set of relevant tables a user groups table, columns of the user groups table comprising group user indicia and individual user identification indicia from the set of user information, and rows of the user groups table corresponding to an individual user that is a member of the at least one user group; and
responsive to deletion of a row from the user groups table, make no change to the compiled access control list.

20. The system of claim 17, wherein the hardware processor is further configured with logic to:
maintain as one of the set of relevant tables an access codes table, the access codes table comprising code indicia uniquely identifying each of the plurality of access control lists; and
responsive to insertion of a code indicia into the access codes table that impacts an individual user who has super access capability and that is a member of zero user groups, insert a corresponding entry into the compiled access control list.

21. The system of claim 17, wherein the hardware processor is further configured with logic to:

maintain as one of the set of relevant tables a users table, columns of the users table comprising individual user identification indicia from the set of user information and corresponding user privilege set indicia for at least one individual user; and maintain as one of the set of relevant tables a user groups table, columns of the user groups table comprising group user indicia and individual user identification indicia from the set of user information, and rows of the user groups table corresponding to an individual user that is a member of the at least one user group.

22. The system of claim 17, wherein the hardware processor is further configured with logic to:

maintain as one of the set of relevant tables a users table, columns of the users table comprising individual user identification indicia from the set of user information and corresponding user privilege set indicia for at least one individual user;

maintain as one of the set of relevant tables a user groups table, columns of the user groups table comprising group user indicia and individual user identification indicia from the set of user information, and rows of the user groups table corresponding to an individual user that is a member of the at least one user group; and responsive to updating of a row in the users table for an individual user who is a member of zero user groups and whose corresponding user privilege set indicia includes indicia of super access capability, update corresponding entries in the compiled access control list for the individual user.

* * * * *